United States Patent
Zhang et al.

(10) Patent No.: US 11,785,195 B2
(45) Date of Patent: Oct. 10, 2023

(54) METHOD AND APPARATUS FOR PROCESSING THREE-DIMENSIONAL VIDEO, READABLE STORAGE MEDIUM AND ELECTRONIC DEVICE

(71) Applicant: Beijing Bytedance Network Technology Co., Ltd., Beijing (CN)

(72) Inventors: Shupeng Zhang, Beijing (CN); Yameng Li, Beijing (CN); Ziyu Li, Beijing (CN); Ningfei Yang, Beijing (CN); Sixue Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/885,323

(22) Filed: Aug. 10, 2022

(65) Prior Publication Data

US 2022/0417486 A1    Dec. 29, 2022

Related U.S. Application Data

(63) Continuation of application No. PCT/CN2021/077741, filed on Feb. 24, 2021.

(30) Foreign Application Priority Data

Mar. 27, 2020 (CN) .......................... 202010232159.1

(51) Int. Cl.
   *H04N 13/106* (2018.01)
   *H04N 19/597* (2014.01)
(52) U.S. Cl.
   CPC ......... *H04N 13/106* (2018.05); *H04N 19/597* (2014.11)

(58) Field of Classification Search
   CPC .. H04N 13/106; H04N 19/597; H04N 21/816; H04N 13/122; H04N 13/261;
   (Continued)

(56) References Cited

U.S. PATENT DOCUMENTS

2014/0328405 A1* 11/2014 Shen .................... H04N 19/597
                                                            375/240.16
2015/0269785 A1    9/2015 Bell et al.
(Continued)

FOREIGN PATENT DOCUMENTS

CN    101271469 A    9/2008
CN    102164265 A    8/2011
(Continued)

OTHER PUBLICATIONS

International Search Report issued in International Patent Application No. PCT/CN2021/077741 dated May 20, 2021.
(Continued)

*Primary Examiner* — Tat C Ohio
(74) *Attorney, Agent, or Firm* — ARENTFOX SCHIFF LLP

(57) ABSTRACT

A method and an apparatus for processing a three-dimensional video, a readable storage medium and an electronic device are involved in the present disclosure, and the present disclosure relates to the field of electronic information technologies. The method is applied to a terminal device, and includes: sending an initial two-dimensional image to a server, so that the server generates an initial three-dimensional video according to the initial two-dimensional image; receiving the initial three-dimensional video sent by the server, and processing the initial three-dimensional video to obtain a target three-dimensional video. According to the present disclosure, a two-dimensional image on the terminal device is uploaded to the server and is converted into a
(Continued)

three-dimensional video by the server, then the three-dimensional video is processed by the terminal device.

17 Claims, 11 Drawing Sheets

(58) Field of Classification Search
CPC .. H04N 21/234; H04N 13/158; H04N 13/161; H04N 21/23424
See application file for complete search history.

(56) References Cited

U.S. PATENT DOCUMENTS

| | | | |
|---|---|---|---|
| 2019/0026958 | A1 | 1/2019 | Gausebeck et al. |
| 2019/0342541 | A1* | 11/2019 | Bai .................... G06T 7/521 |
| 2022/0030248 | A1* | 1/2022 | Toma .................. H04N 19/156 |
| 2022/0092330 | A1* | 3/2022 | Amano ................ G06T 7/0004 |

FOREIGN PATENT DOCUMENTS

| | | |
|---|---|---|
| CN | 102572486 A | 7/2012 |
| CN | 105472374 A | 4/2016 |
| CN | 106303492 A | 1/2017 |
| CN | 106303494 A | 1/2017 |
| CN | 107393000 A | 11/2017 |
| CN | 108632597 A | 10/2018 |
| CN | 108769646 A | 11/2018 |
| CN | 108961375 A | 12/2018 |
| CN | 109035373 A | 12/2018 |
| CN | 109151430 A | 1/2019 |
| CN | 109615478 A | 4/2019 |
| CN | 109743584 A | 5/2019 |
| CN | 110910338 A | 3/2020 |
| CN | 111447504 A | 7/2020 |
| EP | 2764696 A2 | 8/2014 |
| JP | 2017033312 A | 2/2017 |
| KR | 1020140103910 A | 8/2014 |
| KR | 1020140122054 A | 10/2014 |
| TW | 201121318 A | 6/2011 |
| WO | 2016184285 A1 | 11/2016 |
| WO | 2017170761 A1 | 10/2017 |

OTHER PUBLICATIONS

Chinese First Office Action issued in Chinese Patent Application No. 202010232159.1.
Chinese Notice of Allowance issued in Chinese Application No. 202010232159.1.
Fu, Jinxing., "Research on Stereo Video on Demand and Broadcast Systems", CNKI, Mar. 16, 2015, URL: https://kns.cnki.net/kcms/detail/detail.aspx?dbcode=CMFD&dbname=CMFD202201&filename=1015524626.nh&uniplatform=NZKPT&v=1j4dn4hDLq1ynysJEV98pGmnllhsTvx0HkXzB3wDlkx5xtOISrarJq5EoE6A6SFL.
Extended European Search report dated Jul. 24, 2023, in European Patent Application No. 21774658.5.
Office Action dated Jul. 5, 2023, in Korean Patent Application No. 10-2022-7033921.

* cited by examiner

METHOD AND APPARATUS FOR PROCESSING THREE-DIMENSIONAL VIDEO, READABLE STORAGE MEDIUM AND ELECTRONIC DEVICE

CROSS-REFERENCE TO RELATED APPLICATIONS

This application is a continuation of International Application No. PCT/CN2021/077741, filed on Feb. 24, 2021, which claims priority to Chinese Patent Application No. 202010232159.1, filed on Mar. 27, 2020, entitled "METHOD AND APPARATUS FOR PROCESSING THREE-DIMENSIONAL VIDEO, READABLE STORAGE MEDIUM AND ELECTRONIC DEVICE". The disclosures of the aforementioned applications are hereby incorporated by reference in their entireties.

TECHNICAL FIELD

The present disclosure relates to the field of electronic information technologies and, in particular, to a method and an apparatus for processing a three-dimensional video, a readable storage medium, and an electronic device.

BACKGROUND

With continuous development of terminal technologies and image processing technologies, image processing operations which can be provided on a terminal device are becoming more and more abundant. For example, the terminal device may shoot a three-dimensional (3-Dimension, 3D) image or video, so as to bring richer visual experience to a user. Generally, the terminal device needs to be equipped with a 3D camera or an external 3D camera to collect the three-dimensional image or video.

SUMMARY

This Summary is provided to introduce concepts in a simplified form, and the concepts will be further described below in description of embodiments. This Summary is not intended to identify key features or essential features of the claimed technical solution, nor is it intended to be used to limit the scope of the claimed technical solution.

According to a first aspect, the present disclosure provides a method for processing a three-dimensional video, applied to a terminal device, where the method includes:

sending at least one initial two-dimensional image to a server, which enables the server to generate an initial three-dimensional video according to the at least one initial two-dimensional image;

receiving the initial three-dimensional video sent by the server; and performing processing on the initial three-dimensional video to obtain a target three-dimensional video.

According to a second aspect, the present disclosure provides a method for processing a three-dimensional video, applied to a server, where the method includes:

receiving at least one initial two-dimensional image sent by a terminal device, and generating an initial three-dimensional video according to the at least one initial two-dimensional image; and sending the initial three-dimensional video to the terminal device, which enables the terminal device to perform processing on the initial three-dimensional video to obtain a target three-dimensional video.

According to a third aspect, the present disclosure provides an apparatus for processing a three-dimensional video, where the processing apparatus includes:

a sending module, configured to send at least one initial two-dimensional image to a server, which enables the server to generate an initial three-dimensional video according to the at least one initial two-dimensional image;

a receiving module, configured to receive the initial three-dimensional video sent by the server; and a processing module, configured to perform processing on the initial three-dimensional video to obtain a target three-dimensional video.

According to a fourth aspect, the present disclosure provides an apparatus for processing a three-dimensional video, where the processing apparatus includes:

a receiving module, configured to receive at least one initial two-dimensional image sent by a terminal device, and generate an initial three-dimensional video according to the at least one initial two-dimensional image; and a sending module, configured to send the initial three-dimensional video to the terminal device, which enables the terminal device to perform processing on the initial three-dimensional video to obtain a target three-dimensional video.

According to a fifth aspect, the present disclosure provides a computer readable storage medium, on which a computer program is stored, and the program is configured to implement the method according to the first aspect of the present disclosure when being executed by a processor.

According to a sixth aspect, the present disclosure provides an electronic device, including:

a memory, on which a computer program is stored; and a processor, configured to execute the computer program stored in the memory, so as to implement the method according to the first aspect of the present disclosure.

According to a seventh aspect, the present disclosure provides a computer readable storage medium, on which a computer program is stored, and the program is configured to implement the method according to the second aspect of the present disclosure when being executed by a processor.

According to an eighth aspect, the present disclosure provides an electronic device, including:

a memory, on which a computer program is stored; and a processor, configured to execute the computer program stored in the memory, so as to implement the method according to the second aspect of the present disclosure.

According to a ninth aspect, the present disclosure provides a system for processing a three-dimensional video, where the system includes: a terminal device and a server;

the terminal device is configured to implement the method according to the first aspect of the present disclosure; and the server is configured to implement the method according to the second aspect of the present disclosure.

According to a tenth aspect, some embodiments of the present disclosure provide a computer program product, including a computer program hosted on a computer readable medium, where the computer program, when being executed by a processor, enables the processor to implement the method according to the first aspect of the present disclosure.

According to an eleventh aspect, some embodiments of the present disclosure provide a computer program product, including a computer program hosted on a computer readable medium, where the computer program, when being executed by a processor, enables the processor to implement the method according to the second aspect of the present disclosure.

According to a twelfth aspect, the present disclosure provides a computer program, when being run on an electronic device, causes the electronic device to implement the method according to the first aspect of the present disclosure.

According to a thirteenth aspect, the present disclosure provides a computer program, when being run on an electronic device, causes the electronic device to implement the method according to the second aspect of the present disclosure.

BRIEF DESCRIPTION OF DRAWINGS

The above and other features, advantages, and aspects of various embodiments of the present disclosure will become more apparent with reference to the following description of embodiments in conjunction with accompanying drawings. The same or similar reference signs represent the same or similar elements throughout the accompanying drawings, it should be understood that the accompanying drawings are illustrative and that components and elements are not necessarily drawn according to scale. In the accompanying drawings.

DESCRIPTION OF EMBODIMENTS

Figure 1:
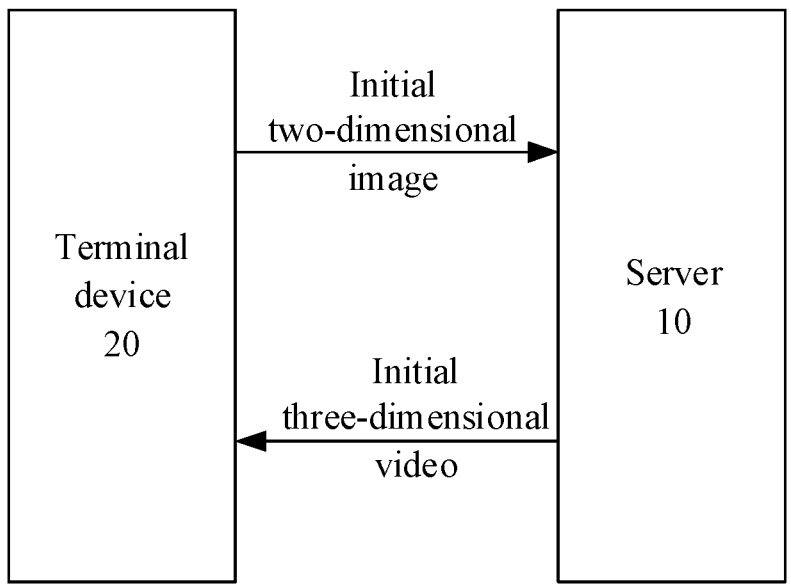
FIG. 1 is a schematic diagram of data transmission between a terminal device and a server.

Embodiments of the present disclosure will be described in more detail below with reference to the accompanying drawings. Although certain embodiments of the present disclosure are shown in the accompanying drawings, it should be understood that the present disclosure may be implemented in various forms and should not be construed as being limited to the embodiments set forth herein, instead, these embodiments are provided for a thorough and complete understanding of the present disclosure. It should be understood that the accompanying drawings and embodiments of the present disclosure are only for illustrative purposes and are not intended to limit the scope of the present disclosure.

It should be understood that, steps recorded in method embodiments of the present disclosure may be executed in different orders, and/or executed in parallel. Furthermore, the method embodiments may include additional steps and/or may omit performing the illustrated steps. The scope of the present disclosure is not limited in this aspect.

The term "including" and variations thereof, as used herein, are opening inclusive, i.e., "including but not limited to", the term "based on" is "at least partly based on", the term "an embodiment" means "at least one embodiment"; the term "another embodiment" means "at least one further embodiment"; and the term "some embodiments" means "at least some embodiments". Relevant definitions of other terms will be given in the following description.

It should be noted that, the "first", "second" and other concepts mentioned in the present disclosure are only used to distinguish different apparatuses, modules, or units, but are not used to limit the sequence or dependency of functions performed by these apparatuses, modules, or units.

It should be noted that, the definitions of "a" and "a plurality of" mentioned in the present disclosure are illustrative rather than restrictive, and a person skilled in the art should understand that, they should be understood as "one or more" unless the context clearly indicates otherwise.

The names of messages or information interacted between a plurality of apparatuses in the embodiments of the present disclosure are only for illustrative purposes, and are not intended to limit the scope of these messages or information.

With continuous development of terminal technologies and image processing technologies, image processing operations which can be provided on a terminal device are becoming more and more abundant. For example, the terminal device may shoot a three-dimensional (3-Dimension, 3D) image or video, so as to bring richer visual experience to a user. Generally, the terminal device needs to be equipped with a 3D camera or an external 3D camera to collect the three-dimensional image or video. However, the price of the 3D camera is relatively high, and hardware of the terminal device also needs to be changed, thus the cost is high and the operation is troublesome, thereby limiting the visual experience of the user on the terminal device.

Before describing a method and an apparatus for processing a three-dimensional video, a readable storage medium, and an electronic device which are provided in the present disclosure, an application scenario related to the embodiments of the present disclosure are first described. The application scenario may include a terminal device and a server, and data transmission may be performed between the terminal device and the server. The terminal device may include, but is not limited to, a mobile terminal such as a mobile phone, a laptop computer, a digital broadcast receiver, a PDA (Personal Digital Assistant), a PAD (tablet computer), a PMP (Portable Multimedia Player), an in-vehicle terminal (e.g., an in-vehicle navigating terminal), and the like, and a fixed terminal such as a digital TV, a desktop computer, and the like. The server may include, but is not limited to, a physical server, a server cluster, or a cloud server, etc. In a specific implementation scenario, one or more terminal devices and one or more servers may be included. As shown in FIG. 1, a terminal device 20 may send at least one initial two-dimensional image to a server 10. After receiving the at least one initial two-dimensional image, the server 10 performs processing on the received at least one initial two-dimensional image according to a preset algorithm to obtain an initial three-dimensional video, and sends the initial three-dimensional video to the terminal device 20. The terminal device 20 acquires the initial three-dimensional video from the server 10, and performs processing on the initial three-dimensional video to obtain a target three-dimensional video.

Figure 2:
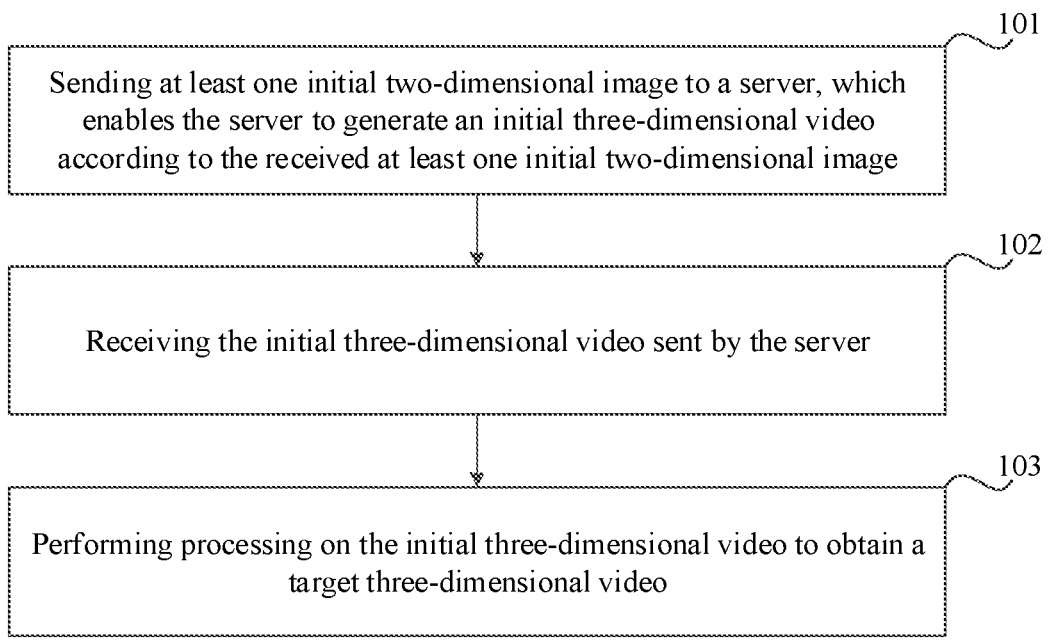
FIG. 2 is a flowchart illustrating a method for processing a three-dimensional video according to an illustrative embodiment.

FIG. 2 is a flowchart illustrating a method for processing a three-dimensional video according to an illustrative embodiment. As shown in FIG. 2, the method may be applied to a terminal device and may include the following.

Step 101: sending at least one initial two-dimensional image to a server, which enables the server to generate an initial three-dimensional video according to the received at least one initial two-dimensional image.

For example, an initial two-dimensional image may include a two-dimensional image collected in real time by a user using the terminal device (for example, a two-dimensional picture shot in real time by using the terminal device), and may also include an image selected by the user from two-dimensional images stored on the terminal device (for example, a two-dimensional image selected on a display interface of the terminal device). The terminal device may send one or more initial two-dimensional images to the server. The terminal device may first encode an initial two-dimensional image to be sent, the encoded initial two-dimensional image is then sent to the server. The terminal device can use a specific encoding scheme to ensure the quality and efficiency of the transmission of the at least one initial two-dimensional image between the terminal device and the server. Accordingly, the server may decode the encoded at least one initial two-dimensional image that is received, to derive the decoded at least one initial two-dimensional image.

After receiving the at least one initial two-dimensional image sent by the terminal device, the server performs processing on the received at least one initial two-dimensional image according to a preset algorithm to obtain the initial three-dimensional video corresponding to the at least one initial two-dimensional image. Since the computation amount of the preset algorithm is large, and certain computing resources and storage resources need to be consumed, processing steps for converting the initial two-dimensional images into the initial three-dimensional video are handed over to the server for completion, without being restricted by limited computing resources and storage resources of the terminal device, the processing speed and reliability of image processing are improved, and the operation experience and visual experience of the user are also improved.

In an embodiment, when receiving initial two-dimensional images, the server may sequentially perform processing on each initial two-dimensional image to obtain three-dimensional video segments corresponding to each of the initial two-dimensional images, that is, the initial three-dimensional video includes the three-dimensional video segments corresponding to each of the initial two-dimensional images. The server may merge the three-dimensional video segments corresponding to each of the initial two-dimensional images to obtain a merged three-dimensional video as the initial three-dimensional video. In addition, the server may further perform rendering on three-dimensional video segments corresponding to any one or more initial two-dimensional images, so as to obtain corresponding rendered three-dimensional video segments. Then, the server merges all the three-dimensional video segments, and uses the obtained merged three-dimensional video as the initial three-dimensional video.

After generating the initial three-dimensional video, the server may send the initial three-dimensional video to the terminal device. In an embodiment, the server may send the initial three-dimensional video to the terminal device in a streaming transmission manner. For example, the server may send the initial three-dimensional video to the terminal device in a manner such as a real time streaming transmission (Realtime Streaming) or a progressive streaming transmission (Progressive Streaming), which is not limited in the present disclosure.

Step 102: receiving the initial three-dimensional video sent by the server.

Step 103: performing processing on the initial three-dimensional video to obtain a target three-dimensional video.

After acquiring the initial three-dimensional video, the terminal device may store the initial three-dimensional video first, so that when performing an operation on the initial three-dimensional video again, the initial three-dimensional video may be acquired directly from the local without being acquired from the server again. Then, the terminal device performs processing on the initial three-dimensional video to obtain the target three-dimensional video. In addition, after receiving the initial three-dimensional video, the terminal device may also perform processing on the initial three-dimensional video without storing the initial three-dimensional video, which is not limited in the present disclosure.

In an embodiment, in a process where the server performs processing on the initial two-dimensional image according to the preset algorithm to obtain the initial three-dimensional video, each initial two-dimensional image may be converted into a corresponding three-dimensional video segment according to image contents included in each initial two-dimensional image, a three-dimensional video obtained by performing processing such as merging on the three-dimensional video segments corresponding to each of the initial two-dimensional images is sent to the terminal device as the initial three-dimensional video. The terminal device may first decode the initial three-dimensional video to obtain an initial image frame set of the initial three-dimensional video, where the initial image frame set includes a plurality of initial image frames. Then, the terminal device may perform processing on the initial image frames in the initial image frame set according to a specific requirement of the user. When processing the initial image frame set, the terminal device may perform rendering and splicing for at least one initial image frame in the initial image frame set, may perform rendering only for at least one initial image frame in the initial image frame set, and may also perform splicing only for a plurality of initial image frames in the initial image frame set. Rendering may include, for example, adding texts, special effects, a filter, and the like to an initial image frame, and can further include an operation which is performed on the initial image frame, such as cutting, zooming in, zooming out, changing from a horizontal screen to a vertical screen, changing from a vertical screen to a horizontal screen. Splicing may include, for example, splicing the plurality of initial image frames by selecting different rotation effects, and the rotation effects include, but are not limited to, an acceleration, a deceleration, a cross-scribing, a stack, scrolling, a transverse, a vertical, layered pushing, a rotation, etc.

In another embodiment, in a process where the server performs processing on the initial two-dimensional image according to the preset algorithm to obtain the initial three-dimensional video, each initial two-dimensional image may be converted into a corresponding three-dimensional video segment according to image contents included in each initial two-dimensional image. Then, rendering and splicing operations are performed on one or more three-dimensional video segments according to a specific requirement of the user from the terminal device, to obtain the initial three-dimensional video. In this way, when processing the initial three-dimensional video, the terminal device may obtain the target three-dimensional video by omitting rendering and splicing operations. For example, the terminal device may send a user's requirement and an initial two-dimensional image to the server, so that the server may generate an initial three-dimensional video by executing the preset algorithm, the rendering and splicing operations according to the requirement. In this way, consumption of computing resources and storage resources on the terminal device caused by rendering and splicing operations on the three-dimensional video can be reduced. Therefore, the steps of performing rendering and splicing on the initial three-dimensional video are handed over to the server for completion, without being restricted by limited computing resources and storage resources of the terminal device, the processing speed and reliability of image processing are also improved, and the operation experience and visual experience of the user are also improved.

After obtaining the target three-dimensional video, the terminal device may display the target three-dimensional video on a display screen. The terminal device may also store the target three-dimensional video in a memory of the terminal device, so that the user can view the target three-dimensional video at any time. In addition, the terminal device may also share the target three-dimensional video via a network, for example, may share the target three-dimensional video via a designated APP (Application). This is not specifically limited in the present disclosure.

The target three-dimensional video obtained by the terminal device in the present disclosure may be understood as: on the basis of generating the initial three-dimensional video according to the initial two-dimensional image, obtaining the target three-dimensional video by means of corresponding processing, so as to present the initial two-dimensional image in a three-dimensional video mode according to specific requirements of the user. Thus, on the premise that a hardware apparatus of the terminal device is not modified, richer visual experience and operation experience are brought to the user.

In conclusion, in the present disclosure, the terminal device first sends at least one initial two-dimensional image to the server, so that the server generates the initial three-dimensional video according to the received initial two-dimensional image; and then the terminal device acquires the initial three-dimensional video from the server, and performs processing on the initial three-dimensional video, so as to obtain the target three-dimensional video. According to the present disclosure, the two-dimensional image on the terminal device is uploaded to the server and is converted into the three-dimensional video by the server, and then the three-dimensional video is processed by the terminal device, so that a three-dimensional video satisfying personalized requirements can be quickly generated from a local two-dimensional image without modifying a hardware apparatus of the terminal device, thereby improving the operation experience and visual experience of the user.

Figure 3:
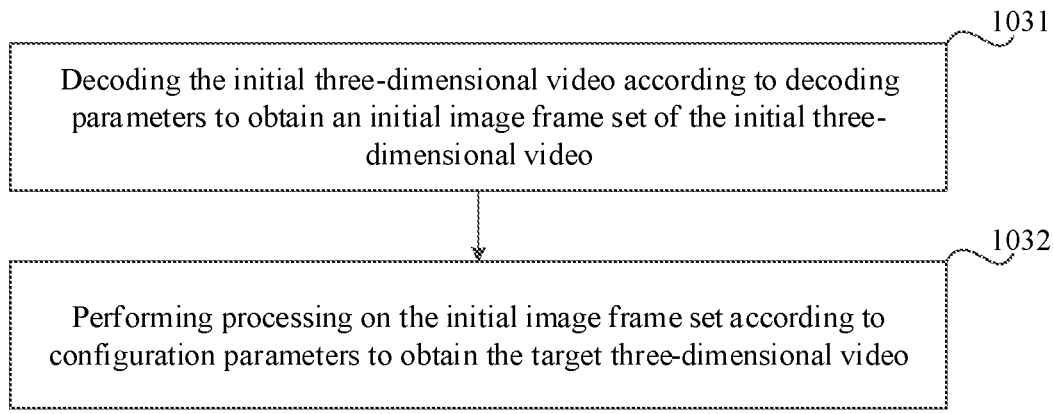
FIG. 3 is a flowchart illustrating another method for processing a three-dimensional video according to an illustrative embodiment.

FIG. 3 is a flowchart illustrating another method for processing a three-dimensional video according to an illustrative embodiment. As shown in FIG. 3, the implementation of step 103 in FIG. 2 may include the following steps.

Step 1031: decoding the initial three-dimensional video according to decoding parameters to obtain an initial image frame set of the initial three-dimensional video.

Step 1032: performing processing on the initial image frame set according to configuration parameters to obtain the target three-dimensional video.

Specifically, after acquiring the initial three-dimensional video, the terminal device may decode the initial three-dimensional video according to the decoding parameters, so as to obtain the initial image frame set of the initial three-dimensional video. The decoding parameters may include a frame rate of the initial three-dimensional video, a resolution of an image frame, etc.

The configuration parameters may include at least one of rendering parameters and splicing parameters. In step 1032, the terminal device performs processing on the initial image frame set according to the configuration parameters, which may include performing rendering and/or splicing on at least one initial image frame in the initial image frame set according to the corresponding rendering parameters and/or splicing parameters. For example, the terminal device may perform rendering on at least one initial image frame in the initial image frame set according to the rendering parameters to obtain the rendered image frame set, and then perform splicing on the image frames in the rendered image frame set according to the splicing parameters to obtain the target three-dimensional video; or, the terminal device may perform rendering on at least one initial image frame in the initial image frame set according to the rendering parameters to obtain the target three-dimensional video; or, the terminal device may perform splicing on a plurality of initial image frames in the initial image frame set according to the splicing parameters to obtain the target three-dimensional video. The configuration parameters may include parameters which are pre-selected by the user according to specific requirements and indicates how to process the initial three-dimensional video. In an embodiment, the configuration parameters may be included in a target model pre-selected by the user according to specific requirements. Illustratively, the target model may include a sample video and parameters corresponding to the sample video. After the user views the sample video, and if it is desired to obtain a target three-dimensional video in the same format as the sample video, a target model may be selected. The terminal device uses parameters corresponding to the sample video included in the target model as the configuration parameters, and performing processing on the initial image frame set according to the configuration parameters, so as to obtain a target three-dimensional video having the same format as the sample video.

The rendering parameters may include designated rendering effects, and the rendering effects may include (but are not limited to): text rendering, special effects, a filter, cutting, zooming in, zooming out, changing from a horizontal screen to a vertical screen, changing from a vertical screen to a horizontal screen, etc. The splicing parameters may include designated rotation effects, which may include (but are not limited to): an acceleration, a deceleration, cross-scribing, a stack, scrolling, a traverse, a vertical, a rotation, layered pushing, etc.

The implementation of step 1032 includes at least the following three manners.

Manner 1: performing rendering on at least one initial image frame in the initial image frame set according to the rendering parameters to obtain the rendered image frame set, and performing splicing on image frames in the rendered image frame set according to the splicing parameters to obtain the target three-dimensional video.

In an embodiment, the at least one initial image frame in the initial image frame set may be rendered according to the rendering parameters. For example, the rendering parameters may be: adding peeling special effects to a first to a fifth initial image frames, adding animal decal effects to a sixth to a tenth initial image frames, adding demisting filters to an eleventh to a twentieth initial image frames, and so on, so as to obtain the rendered image frame set. Then, the terminal device splices the image frames in the rendered image frame set according to the splicing parameters. For example, the terminal device splices the image frames in the rendered image frame set according to a time sequence (for example, an arrangement sequence of the image frames in the corresponding initial image frame set or a specified time sequence), and according to the rotation effects set by the splicing parameters. For example, the splicing parameters may be: splicing a first image frame and a second image frame in a cross-scribing manner, and splicing the second image frame and a third image frame in a scrolling manner.

Manner 2: performing rendering on at least one initial image frame in the initial image frame set according to the rendering parameters to obtain the target three-dimensional video.

In an embodiment, the server may first convert each initial two-dimensional image into a three-dimensional video segment according to image contents included in each initial two-dimensional image, and then splice image frames included in any one or more three-dimensional video segments according to the splicing parameters to obtain the initial three-dimensional video. Then, the terminal device decodes the received initial three-dimensional video to obtain an initial image frame set, and then the terminal device renders at least one image frame in the initial image frame set according to the rendering parameters to obtain the target three-dimensional video.

Manner 3: performing splicing on initial image frames in the initial image frame set according to the splicing parameters to obtain the target three-dimensional video.

In an embodiment, the server may first convert each initial two-dimensional image into a corresponding three-dimensional video segment according to image contents included in each initial two-dimensional image, and then render an image frame included in any one or more three-dimensional video segments according to the rendering parameters to obtain the initial three-dimensional video. Then, the terminal device decodes the received initial three-dimensional video to obtain an initial image frame set, and then splices the initial image frames in the initial image frame set according to the splicing parameters to obtain the target three-dimensional video.

Figure 4:
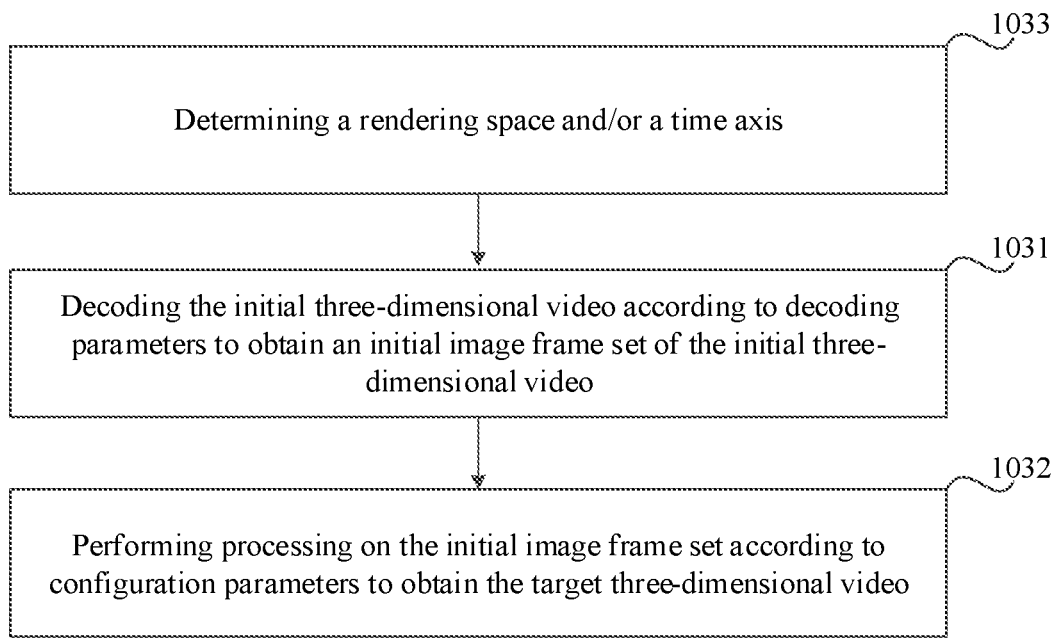
FIG. 4 is a flowchart illustrating another method for processing a three-dimensional video according to an illustrative embodiment.

FIG. 4 is a flowchart illustrating another method for processing a three-dimensional video according to an illustrative embodiment, and as shown in FIG. 4, step 103 in FIG. 2 further includes the following.

Step 1033: determining a rendering space and/or a time axis.

In a specific application scenario, the configuration parameters can further include initialization parameters for determining the rendering space and the time axis. After receiving the initial three-dimensional video, the terminal device may initialize the rendering space according to the initialization parameters, and construct the time axis. The initialization parameters may include, but are not limited to, a size and a resolution of the rendering space, a frame rate corresponding to the time axis, etc. The frame rate corresponding to the time axis may be used to indicate the switching speed between two adjacent image frames, that is, the speed of playing three-dimensional videos, for example, 0.5 times speed or 1.5 times speed.

After the rendering space and the time axis are determined, in an implementation of step 1032, Manner 1 may include:

according to the rendering parameters, performing rendering on at least one initial image frame in the initial image frame set in the determined rendering space to obtain the rendered image frame set, and according to an indication of the time axis, performing splicing on the image frames in the rendered image frame set according to the splicing parameters to obtain the target three-dimensional video. For example, the terminal device may initialize the rendering space in a graphics card memory of the terminal device, put textures of the image frames into the rendering space, and render the textures of the image frames in the rendering space.

After the rendering space is determined, in an implementation of step 1032, Manner 2 may include:

performing rendering on the at least one initial image frame in the initial image frame set in the rendering space according to the rendering parameters to obtain the target three-dimensional video.

In addition, after the time axis is determined, in an implementation of step 1032, Manner 3 may include:

according to an indication of the time axis, performing splicing on the initial image frames in the initial image frame set according to the splicing parameters to obtain the target three-dimensional video.

A person skilled in the art should understand that, there is no necessary execution order between step 1033 and step 1031 in FIG. 4, step 1033 may be executed first, and then step 1031 is executed; or, step 1031 may be executed first, and then step 1033 is executed; or, step 1033 and step 1031 may be executed simultaneously, which is not specifically limited in the embodiments of the present disclosure.

Figure 5:
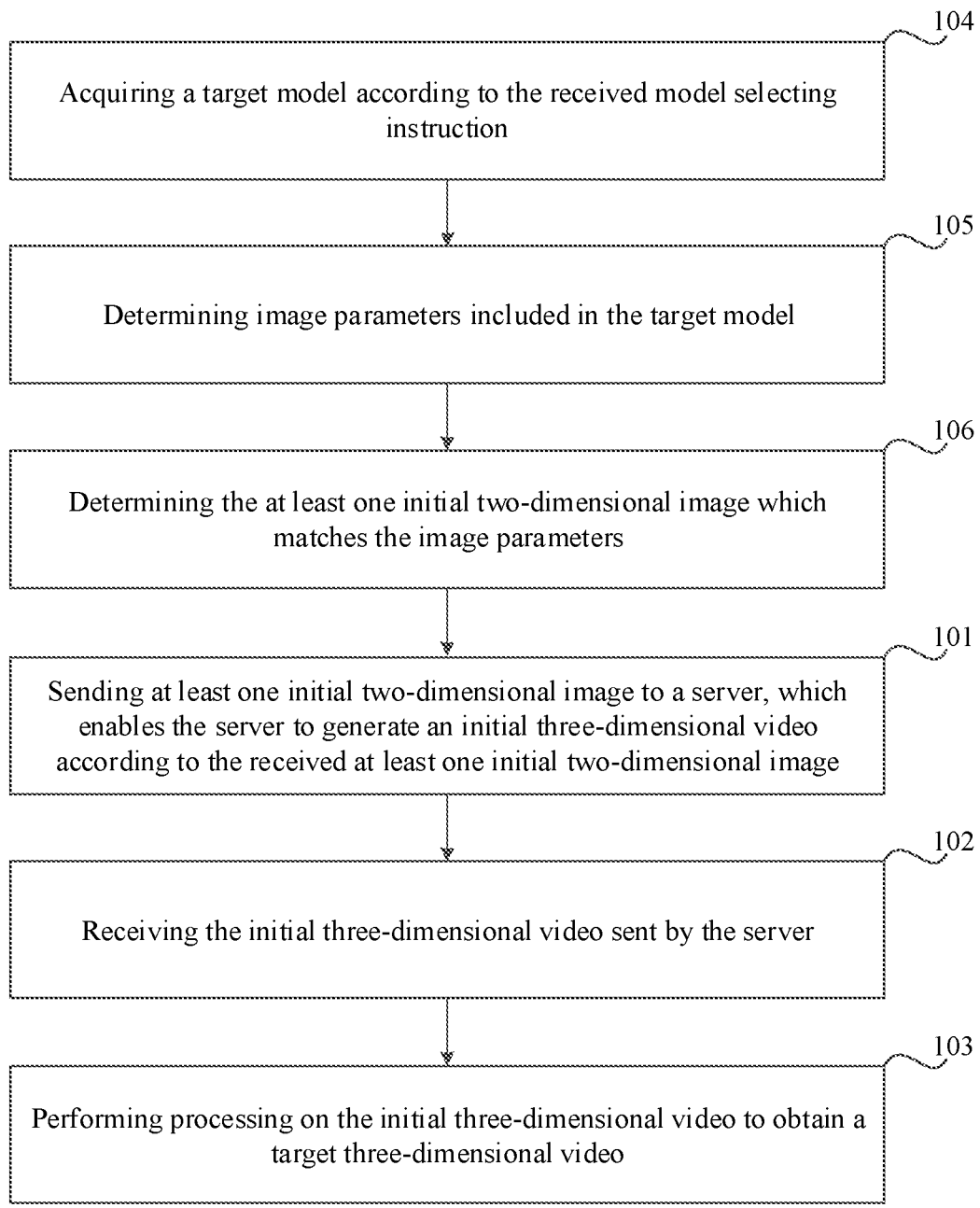
FIG. 5 is a flowchart illustrating another method for processing a three-dimensional video according to an illustrative embodiment.

FIG. 5 is a flowchart illustrating another method for processing a three-dimensional video according to an illustrative embodiment. As shown in FIG. 5, before step 101 in FIG. 2, the method further includes the following.

Step 104: acquiring a target model according to the received model selecting instruction, where the model selecting instruction includes target model information for indicating the target model.

For example, before sending the initial two-dimensional image to the server, the terminal device may further receive the model selecting instruction which is issued by the user and includes the target model information, and then acquire the target model according to the model selecting instruction. The target model information may be used to specify a target model, and may include, for example, a serial number or a name of the target model. The target model may include a sample video, which is used for presenting an illustrative three-dimensional video generated by the model to a user, so as to facilitate the user to select a required target model. It may be understood that the target model includes the sample video, decoding parameters corresponding to the sample video, configuration parameters (for example, may include: rendering parameters and splicing parameters and the like) and image parameters. After receiving the initial three-dimensional video, the terminal device processes the initial three-dimensional video according to the configuration parameters corresponding to the target model, so as to generate a target three-dimensional video having the same format as the sample video.

Step 105: determining image parameters included in the target model.

In an embodiment, the target model can further include decoding parameters and configuration parameters, and the terminal device can also determine the decoding parameters and the configuration parameters included in the target model after acquiring the target model.

Step 106: determining the at least one initial two-dimensional image which matches the image parameters.

Illustratively, after determining the image parameters included in the target model, the terminal device may determine, according to the image parameters, an initial two-dimensional image which matches the image parameters. The image parameters may be used to indicate parameters characterizing the initial two-dimensional image, and may include, for example but not limited to, the number, a size, and a resolution and the like of an image. For example, if the image parameters in the target model include the size of two-dimensional images being less than or equal to 1080*720 and the number of two-dimensional images being five, then the initial two-dimensional images uploaded by the terminal device to the server may include five initial two-dimensional images, and the size of each initial two-dimensional image is less than or equal to 1080*720.

Figure 6:
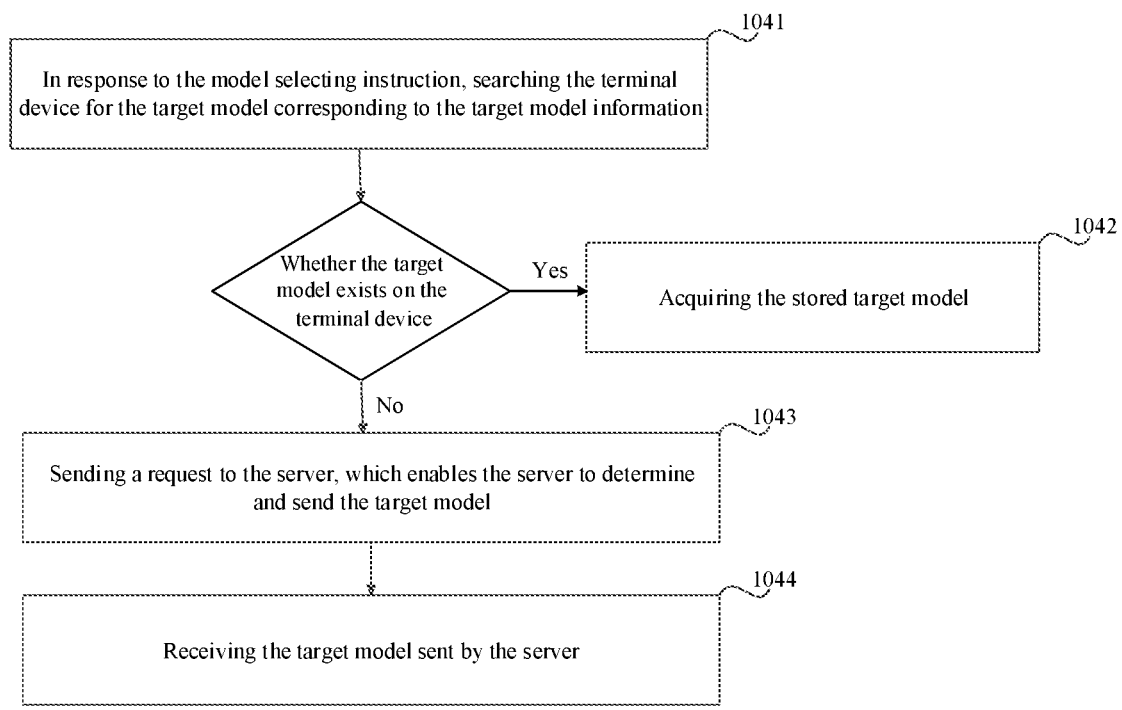
FIG. 6 is a flowchart illustrating another method for processing a three-dimensional video according to an illustrative embodiment.

FIG. 6 is a flowchart illustrating another method for processing a three-dimensional video according to an illustrative embodiment. As shown in FIG. 6, the implementation of step 104 in FIG. 5 may include the following.

Step 1041: in response to the model selecting instruction, searching the terminal device for the target model corresponding to the target model information.

Step 1042: when the target model exists on the terminal device, acquiring the stored target model.

Step 1043: when the target model does not exist on the terminal device, sending a request to the server, which enables the server to determine and send the target model.

Step 1044: receiving the target model sent by the server.

Illustratively, since a storage space of the terminal device is limited, various target models cannot be stored to satisfy diversified requirements of the user; therefore, after receiving a model selecting instruction issued by the user, the terminal device may first search the terminal device for whether the target model corresponding to target model information exists. If the terminal device stores the target model, the stored target model may be acquired directly; and if the target model does not exist on the terminal device, the terminal device may send a request to the server, so that the server sends the target model to the terminal device.

Figure 7:
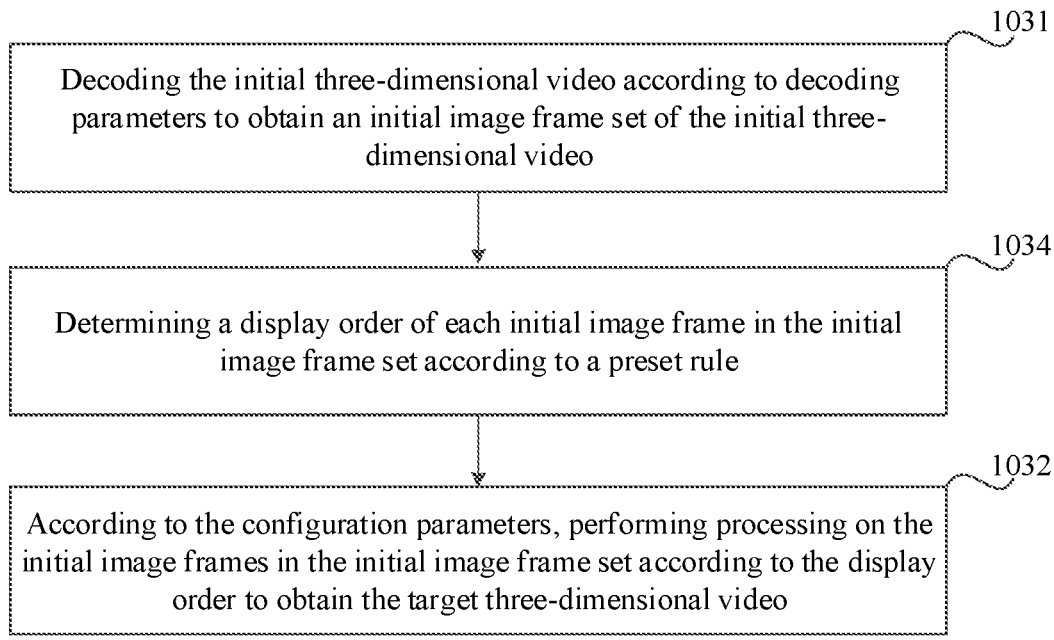
FIG. 7 is a flowchart illustrating another method for processing a three-dimensional video according to an illustrative embodiment.

FIG. 7 is a flowchart illustrating another method for processing a three-dimensional video according to an illustrative embodiment. As shown in FIG. 7, after step 1031, step 103 in FIG. 2 can further include the following.

Step 1034: determining a display order of each initial image frame in the initial image frame set according to a preset rule.

correspondingly, step 1032 may include:

according to the configuration parameters, performing processing on the initial image frames in the initial image frame set according to the display order to obtain the target three-dimensional video.

For example, after decoding the initial three-dimensional video to obtain the initial image frame set, the terminal device may determine the display order of each initial image frame in the initial image frame set according to the preset rule, and then process the initial image frames according to the configuration parameters and according to the display order to obtain the target three-dimensional video. It should be understood that, the terminal device adjusts a sequence of the image frames in the initial image frame set according to the display order, and processes the adjusted initial image frame set according to the configuration parameters, so as to obtain the target three-dimensional video. The specific implementation of processing the adjusted initial image frame set according to the configuration parameters has been described in detail in the foregoing embodiments, which will not be described in detail herein. For example, if the preset rule is video reverse playing, the terminal device determines that the display order of each initial image frame is a reverse order. The terminal device may adjust the order of each initial image frame in the initial image frame set, so that the order of the initial image frames is reversed, thereby achieving the effect of three-dimensional video reverse playing. For another example, if the preset rule is video repeat playing, the terminal device may determine, in the initial image frame set, that the display order of each initial image frame is repeat display, so as to repeat each initial image frame, thereby achieving the effect of three-dimensional video repeat playing. In addition, the terminal device may also realize various combinations of three-dimensional video reverse playing, three-dimensional video repeat playing, and the like by adjusting the display order of the initial image frames in the initial image frame set. For example, each three-dimensional video segment in the three-dimensional video may be first played forward, and then played reversely, so as to satisfy various requirements of the user.

An example in which the initial two-dimensional images includes image 1, image 2, and image 3, and in which after receiving the image 1, the image 2, and the image 3, the server processes the image 1, the image 2, and the image 3 to obtain a three-dimensional video corresponding to each two-dimensional image is used for description. Thus, the initial three-dimensional video includes three initial three-dimensional video segments: initial three-dimensional video segment 1 corresponding to the image 1, initial three-dimensional video segment 2 corresponding to the image 2, and initial three-dimensional video segment 3 corresponding to the image 3, Furthermore, it is assumed that each of the initial three-dimensional video segments includes five initial image frames. The terminal device decodes the initial three-dimensional video segment 1, the initial three-dimensional video segment 2, and the initial three-dimensional video segment 3 separately to obtain 15 initial image frames, and uses the 15 initial image frames as an initial image frame set {P1, P2, P3, P4, P5, P6, . . . , P14, P15}.

A preset rule is used as an example to show a sequence of first displaying the initial three-dimensional video segment 3, then displaying the initial three-dimensional video segment 1, and finally displaying the initial three-dimensional video segment 2, the terminal device may determine the display order of each initial image frame, and adjust the initial image frame set {P1, P2, P3, P4, P5, P6, . . . , P14, P15} to {P11, P12, P13, P14, P15, P1, . . . , P5, P6, . . . , P9, P10}. The terminal device then processes the adjusted initial image frame set according to the configuration parameters to obtain the target three-dimensional video, so that the display effect of the target three-dimensional video when playing is as follows: playing the initial three-dimensional video segment 3 corresponding to the image 3 first, then playing the initial three-dimensional video segment 1 corresponding to the image 1, and finally playing the three-dimensional video 2 corresponding to the initial image 2.

Then, a preset rule is used as an example to show each of the initial three-dimensional video segments as being played forward before being played reversely, and then the terminal device may determine that the display order of the initial image frames is first displayed forward and then displayed reversely. Thus, the terminal device may first copy five initial image frames corresponding to each of the initial three-dimensional video segments, then reverse the order of the copied initial image frames and add them to the rear of the five initial image frames corresponding to the initial three-dimensional video segment. Thus, the obtained adjusted initial image frame set is {P1, P2, P3, P4, P5, P5, P4, P3, P2, P1, P6, . . . , P12, P11}, which is 30 initial image frames in total. The terminal device renders at least one initial image frame in the initial image frame set according to the rendering parameters, in order to obtain a target three-dimensional video, where the rendering parameters, for example, being able to add peeling special effects to a first to a fifth initial image frames in the initial image frame set, adding a demisting filters to a sixth to a tenth initial image frames, and displaying an eleventh to a twentieth initial image frames from a horizontal screen to a vertical screen, adding texts to the twenty-first to the thirtieth initial image frames. The terminal device renders the initial image frames in the adjusted initial image frame set according to the rendering parameters to obtain a target three-dimensional video, where the target three-dimensional video can achieve the effect when playing is as follows: the initial three-dimensional video segment 1 is played forward once on the basis of adding the peeling special effects, the initial three-dimensional video segment 1 is played reversely once on the basis of the demisting filters, and then in a manner of changing from the horizontal screen to the vertical screen, the initial three-dimensional video segment 2 is played forward once and played reversely once, and then in a manner of adding texts, the initial three-dimensional video segment 3 is played forward once and played reversely once.

A person skilled in the art should understand that, after completing the rendering and splicing operations, the terminal device may also determine the display order of the image frames according to the preset rule. That is, the terminal device renders and/or splices the initial image frame set according to the configuration parameters to obtain the processed image frame set. Then, the terminal device determines the display order of each image frame in the processed image frame set according to the preset rule, and adjust positions of the image frames in the image frame set according to the display order to obtain the target three-dimensional video. For a specific implementation, reference may be made to the foregoing description, and for brevity, details are not described herein again.

In conclusion, in the present disclosure, the terminal device first sends at least one initial two-dimensional image to the server, so that the server generates the initial three-dimensional video according to the received initial two-dimensional image; and then the terminal device acquires the initial three-dimensional video from the server, and processes the initial three-dimensional video, so as to obtain the target three-dimensional video. According to the present disclosure, the two-dimensional image on the terminal device is uploaded to the server, the two-dimensional image is converted into the three-dimensional video by the server, and then the three-dimensional video is processed by the terminal device, so that a three-dimensional video satisfying personalized requirements can be quickly generated from a local two-dimensional image without modifying a hardware apparatus of the terminal device, thereby improving the operation experience and visual experience of the user.

Figure 8:
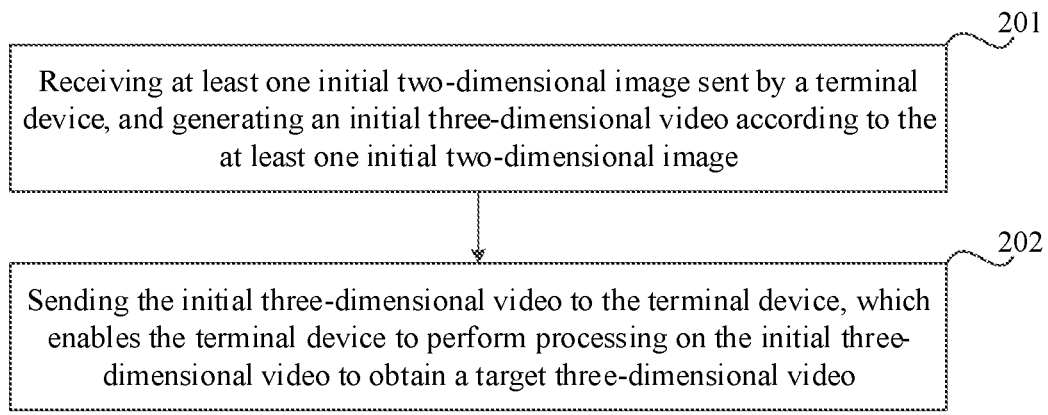
FIG. 8 is a flowchart illustrating a method for processing a three-dimensional video according to an illustrative embodiment.

FIG. 8 is a flowchart illustrating a method for processing a three-dimensional video according to an illustrative embodiment. As shown in FIG. 8, the method is applied to a server, and includes:

step 201: receiving at least one initial two-dimensional image sent by a terminal device, and generating an initial three-dimensional video according to the at least one initial two-dimensional image; and step 202: sending the initial three-dimensional video to the terminal device, which enables the terminal device to perform processing on the initial three-dimensional video to obtain a target three-dimensional video.

For example, if the terminal device encodes the at least one initial two-dimensional image by using a specific encoding scheme before sending the at least one initial two-dimensional image, so as to ensure the quality and efficiency of the transmission of the at least one initial two-dimensional image between the terminal device and the server, and then uploads the encoded at least one initial two-dimensional image to the server, then the server may first decode the encoded at least one initial two-dimensional image that is received, to derive the decoded at least one initial two-dimensional image. Then, the server processes the initial two-dimensional image according to a preset algorithm to obtain the initial three-dimensional video corresponding to the initial two-dimensional image.

Since the computation amount of the preset algorithm is large, and certain computing resources and storage resources need to be consumed, converting the initial two-dimensional images into the initial three-dimensional video is completed by the server, without being restricted by limited computing resources and storage resources of the terminal device, the processing speed and reliability of image processing are improved, and operation experience and visual experience of a user are also improved.

When receiving initial two-dimensional images, the server may sequentially process each of the initial two-dimensional images to obtain three-dimensional video segments corresponding to each of the initial two-dimensional images, that is, the initial three-dimensional video includes the three-dimensional video segments corresponding to each of the initial two-dimensional images. The server may merge the three-dimensional video segments corresponding to each of the initial two-dimensional images to obtain a merged three-dimensional video as the initial three-dimensional video. In addition, the server may further render three-dimensional video segments corresponding to any one or more initial two-dimensional images, so as to obtain corresponding rendered three-dimensional video segments. Then, the server merges all the three-dimensional video segments, and uses the merged three-dimensional video that is obtained as the initial three-dimensional video.

After generating the initial three-dimensional video, the server may send the initial three-dimensional video to the terminal device.

In an embodiment, the server sends the initial three-dimensional video to the terminal device in a streaming transmission manner. After acquiring the initial three-dimensional video, the terminal device may decode the initial three-dimensional video to obtain an initial image frame set of the initial three-dimensional video, and the initial image frame set includes a plurality of initial image frames. Then, the terminal device may process the initial image frames in the initial image frame set according to a specific requirement of the user, so as to obtain the target three-dimensional video. The target three-dimensional video may be understood as a target three-dimensional video obtained through corresponding processing on the basis of the initial three-dimensional video corresponding to the initial two-dimensional images. Thus, the initial two-dimensional images may be presented in a three-dimensional video manner according to the specific requirement of the user, thereby bringing richer visual experience and operational experience to the user without modifying a hardware apparatus of the terminal device.

Figure 9:
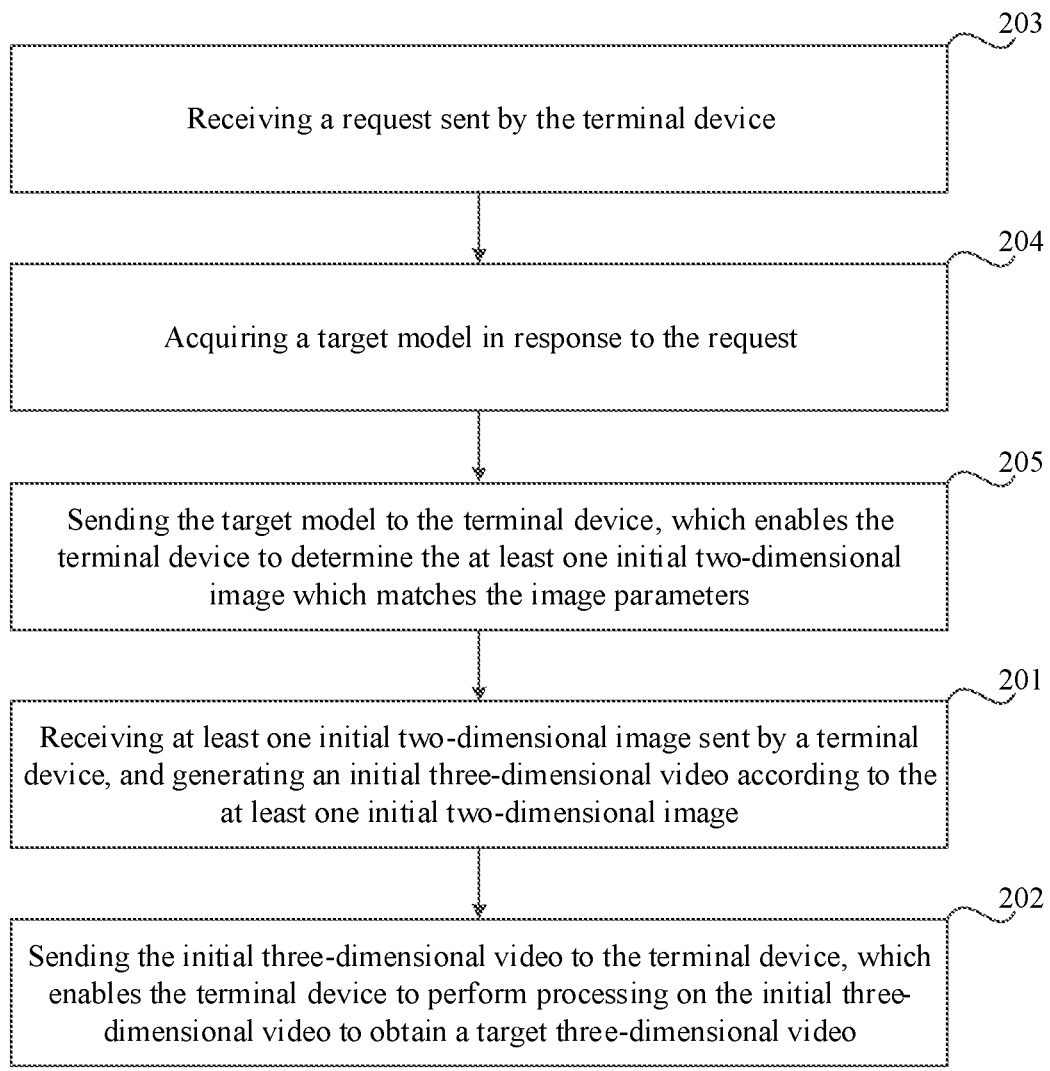
FIG. 9 is a flowchart illustrating another method for processing a three-dimensional video according to an illustrative embodiment.

FIG. 9 is a flowchart illustrating another method for processing a three-dimensional video according to an illustrative embodiment. As shown in FIG. 9, before step 201, the method further includes:

step 203: receiving a request sent by the terminal device, where the request is a request sent by the terminal device when no target model exists on the terminal device;

step 204: acquiring a target model in response to the request, where the target model includes image parameters; and step 205: sending the target model to the terminal device, which enables the terminal device to determine the at least one initial two-dimensional image which matches the image parameters.

Illustratively, before receiving the initial two-dimensional images, the server may further receive the request sent by the terminal device. The server determines the target model according to the request, and sends the target model to the terminal device. The request is sent by the terminal device to the server when the target model does not exist on the terminal device, so as to request the server to send the target model to the terminal device. After receiving the target model, the terminal device determines image parameters included in the target model, and may determine, according to the image parameters, initial two-dimensional images which matches the image parameters. The image parameters may be used to indicate parameters characterizing the initial two-dimensional images, and may include, for example but not limited to, the number, a size, and a resolution and the like of an image.

In conclusion, in the present disclosure, the terminal device first sends at least one initial two-dimensional image to the server, so that the server generates the initial three-dimensional video according to the received initial two-dimensional image; and then the terminal device acquires the initial three-dimensional video from the server, and processes the initial three-dimensional video, so as to obtain the target three-dimensional video. According to the present disclosure, the two-dimensional image on the terminal device is uploaded to the server and is converted into the three-dimensional video by the server, and then the three-dimensional video is processed by the terminal device, so that a three-dimensional video satisfying personalized requirements can be quickly generated from a local two-dimensional image without modifying a hardware apparatus of the terminal device, thereby improving the operation experience and visual experience of the user.

Figure 10:
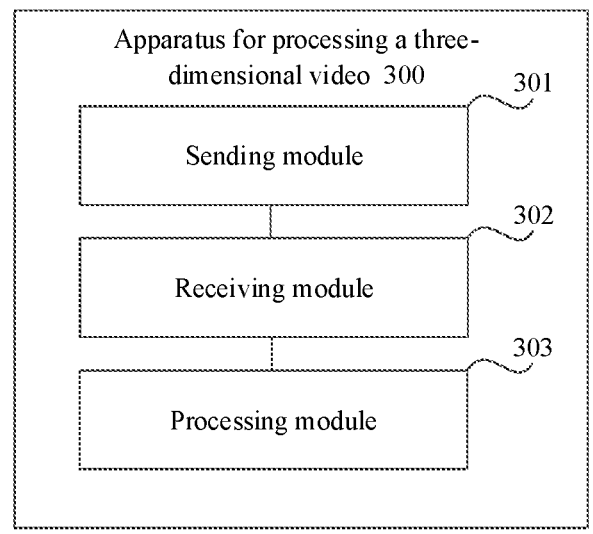
FIG. 10 is a block diagram illustrating an apparatus for processing a three-dimensional video according to an illustrative embodiment.

FIG. 10 is a block diagram illustrating an apparatus for processing a three-dimensional video according to an illustrative embodiment. As shown in FIG. 10, an apparatus 300 includes:

a sending module 301, configured to send at least one initial two-dimensional image to a server, which enables the server to generate an initial three-dimensional video according to the at least one initial two-dimensional image;

a receiving module 302, configured to receive the initial three-dimensional video sent by the server; and a processing module 303, configured to perform processing on the initial three-dimensional video to obtain a target three-dimensional video.

Figure 11:
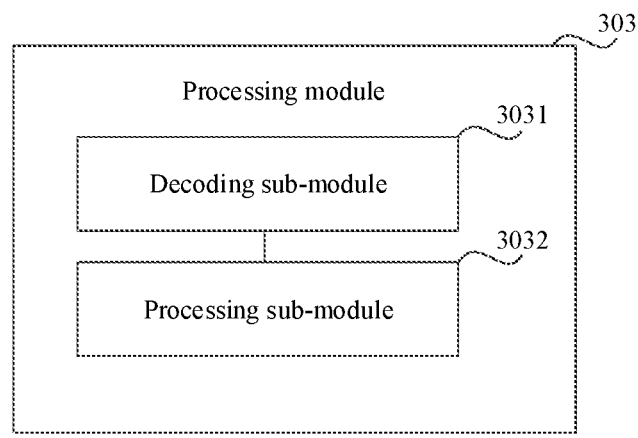
FIG. 11 is a block diagram illustrating another apparatus for processing a three-dimensional video according to an illustrative embodiment.

FIG. 11 is a block diagram illustrating another apparatus for processing a three-dimensional video according to an illustrative embodiment, and as shown in FIG. 11, the processing module 303 includes:

a decoding sub-module 3031, configured to decode the initial three-dimensional video according to decoding parameters to obtain an initial image frame set of the initial three-dimensional video; and a processing sub-module 3032, configured to process the initial image frame set according to configuration parameters to obtain the target three-dimensional video.

Optionally, the configuration parameters include at least one of the following parameters: rendering parameters and splicing parameters, and the processing sub-module 3032 is configured to:

perform rendering on at least one initial image frame in the initial image frame set according to the rendering parameters to obtain the rendered image frame set, and perform splicing on the image frames in the rendered image frame set according to the splicing parameters to obtain the target three-dimensional video; or, perform rendering on at least one initial image frame in the initial image frame set according to the rendering parameters to obtain the target three-dimensional video; or, perform splicing on initial image frames in the initial image frame set according to the splicing parameters to obtain the target three-dimensional video.

Figure 12:
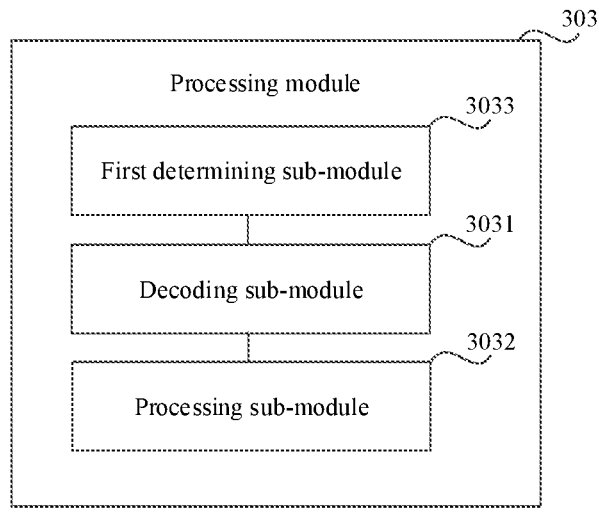
FIG. 12 is a block diagram illustrating another apparatus for processing a three-dimensional video according to an illustrative embodiment.

FIG. 12 is a block diagram illustrating another apparatus for processing a three-dimensional video according to an illustrative embodiment. As shown in FIG. 12, the processing module 303 further includes:

a first determining sub-module 3033, configured to determine a rendering space and/or a time axis;

correspondingly, the processing sub-module 3032 is configured to:

according to the rendering parameters, perform rendering on the at least one initial image frame in the initial image frame set in the rendering space to obtain the rendered image frame set, and according to a time sequence indicated by the time axis, perform splicing on the image frames in the rendered image frame set according to the splicing parameters to obtain the target three-dimensional video; or, perform rendering on the at least one initial image frame in the initial image frame set in the rendering space according to the rendering parameters to obtain the target three-dimensional video; or, according to a time sequence indicated by the time axis, perform splicing on the initial image frames in the initial image frame set according to the splicing parameters to obtain the target three-dimensional video.

Figure 13:
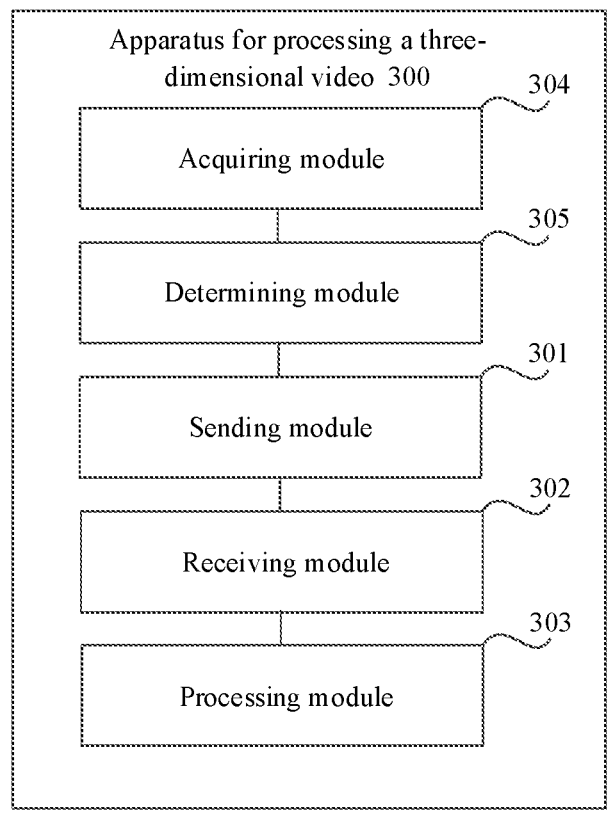
FIG. 13 shows a block diagram illustrating another apparatus for processing a three-dimensional video according to an illustrative embodiment.

FIG. 13 is a block diagram illustrating another apparatus for processing a three-dimensional video according to an illustrative embodiment, and as shown in FIG. 13, the apparatus 300 further includes:

an acquiring module 304, configured to acquire a target model according to the received model selecting instruction before sending at least one initial two-dimensional image to the server, where the model selecting instruction includes target model information for indicating the target model; and a determining module 305, configured to determine image parameters included in the target model, and determine the at least one initial two-dimensional image which matches the image parameters.

Optionally, the acquiring module 304 may be further configured to:

in response to the model selecting instruction, search the terminal device for the target model corresponding to target model information; when the target model does not exist on the terminal device, send a request to the server, which enables the server to determine and send the target model; and receive the target model sent by the server.

Figure 14:
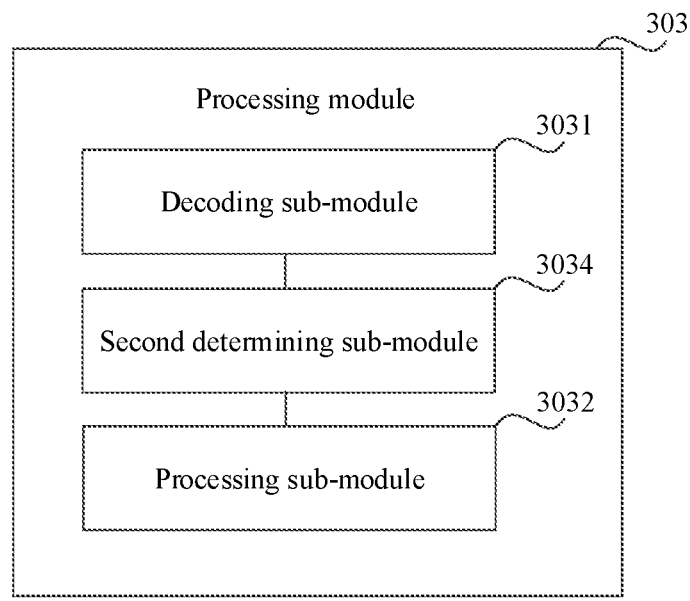
FIG. 14 is a block diagram illustrating another apparatus for processing a three-dimensional video according to an illustrative embodiment.

FIG. 14 is a block diagram illustrating another apparatus for processing a three-dimensional video according to an illustrative embodiment. As shown in FIG. 14, the processing module 303 further includes:

a second determining sub-module 3034, configured to, after decoding the initial three-dimensional video according to the decoding parameters to obtain the initial image frame set of the initial three-dimensional video, determine a display order of each initial image frame in the initial image frame set according to a preset rule;

correspondingly, the processing sub-module 3032 is configured to:

according to the configuration parameters, perform processing on the initial image frames in the initial image frame set according to the display order to obtain the target three-dimensional video.

In another embodiment, the processing sub-module 3032 is configured to perform rendering and/or splicing processing on the initial image frame set according to the configuration parameters to obtain the processed image frame set; and the processing module 303 includes a third determining sub-module, configured to determine, according to a preset rule, a display order of each image frame in the processed image frame set, and adjust, according to the display order, positions of image frames in the processed image frame set to obtain the target three-dimensional video.

With respect to the apparatus in the foregoing embodiments, a specific manner in which the modules execute the operations has been described in detail in the method embodiments, which is not described in detail herein.

The above modules can be implemented as software components being executed on one or more general purpose processors, as well as hardware which performs certain functions or a combination thereof, such as programmable logic devices and/or application specific integrated circuits. In some embodiments, these modules can be implemented in a form of a software product, and the software product may be stored in a non-volatile storage medium, where the non-volatile storage medium includes methods described in the embodiments of the present application which are implemented by a computer device (for example, a personal computer, a server, a network device, a mobile terminal, etc.). In an embodiment, the above modules can also be implemented on a single device or distributed on a plurality of devices. The functions of these modules can be combined with each other, and can also be further divided into a plurality of sub-modules.

In conclusion, in the present disclosure, the terminal device first sends at least one initial two-dimensional image to the server, so that the server generates the initial three-dimensional video according to the received initial two-dimensional image; and then the terminal device acquires the initial three-dimensional video from the server, and processes the initial three-dimensional video, so as to obtain the target three-dimensional video. According to the present disclosure, the two-dimensional image on the terminal device is uploaded to the server and is converted into the three-dimensional video by the server, and then the three-dimensional video is processed by the terminal device, so that a three-dimensional video satisfying personalized requirements can be quickly generated from a local two-dimensional image without modifying a hardware apparatus of the terminal device, thereby improving the operation experience and visual experience of the user.

Figure 15:
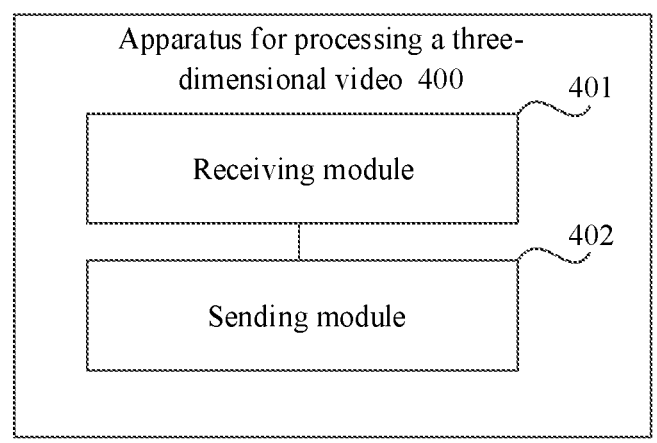
FIG. 15 is a block diagram illustrating an apparatus for processing a three-dimensional video according to an illustrative embodiment.

FIG. 15 is a block diagram illustrating an apparatus for processing a three-dimensional video according to an illustrative embodiment. As shown in FIG. 15, an apparatus 400 is applied to a server, and includes:

a receiving module 401, configured to receive at least one initial two-dimensional image sent by a terminal device, and generate an initial three-dimensional video according to the at least one initial two-dimensional image;

a sending module 402, configured to send the initial three-dimensional video to the terminal device, which enables the terminal device to perform processing on the initial three-dimensional video to obtain a target three-dimensional video.

Figure 16:
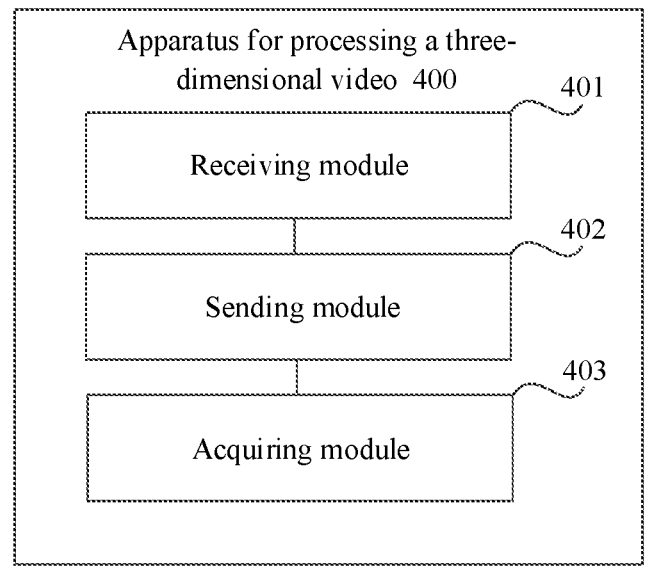
FIG. 16 is a block diagram illustrating another apparatus for processing a three-dimensional video according to an illustrative embodiment.

FIG. 16 is a block diagram illustrating another apparatus for processing a three-dimensional video according to an illustrative embodiment. As shown in FIG. 16, the receiving module 401 is further configured to receive, before receiving the at least one initial two-dimensional image sent by the terminal device, a request sent by the terminal device, where the request is a request sent by the terminal device when no target model exists on the terminal device; and the apparatus 400 further includes:

an acquiring module 403, configured to acquire a target model in response to the request, where the target model includes image parameters; and the sending module 402 is further configured to send the target model to the terminal device, which enables the terminal device to determine the at least one initial two-dimensional image which matches the image parameters.

With respect to the apparatus in the foregoing embodiments, a specific manner in which the modules execute the operations has been described in detail in the method embodiments, which is not described in detail herein.

The above modules can be implemented as software components being executed on one or more general purpose processors, as well as hardware which performs certain functions or a combination thereof, such as programmable logic devices and/or application specific integrated circuits. In some embodiments, these modules can be implemented in a form of a software product, and the software product may be stored in a non-volatile storage medium, where the non-volatile storage medium includes methods described in the embodiments of the present application which are implemented by a computer device (for example, a personal computer, a server, a network device, a mobile terminal, etc.). In an embodiment, the above modules can also be implemented on a single device or distributed on a plurality of devices. The functions of these modules can be combined with each other, and can also be further divided into a plurality of sub-modules.

Figure 17:
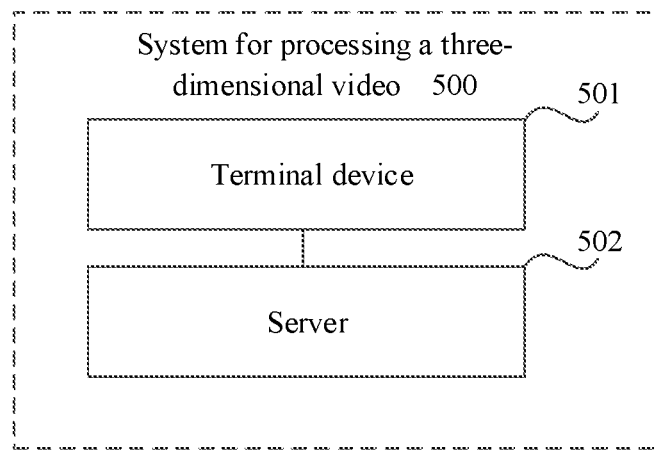
FIG. 17 is a block diagram illustrating a system for processing a three-dimensional video according to an illustrative embodiment.

FIG. 17 is a block diagram illustrating a system for processing a three-dimensional video according to an illustrative embodiment, and as shown in FIG. 17, a system 500 includes a terminal device 501 and a server 502;

the terminal device 501 is configured to implement any one of the methods for processing a three-dimensional video applied to a terminal device provided by the foregoing embodiments; and the server 502 is configured to implement any one of the methods for processing a three-dimensional video applied to a server provided by the foregoing embodiments.

With respect to the system in the foregoing embodiment, a specific manner in which the terminal device and the server execute the operations has been described in detail in the method embodiments, which is not described in detail herein.

In conclusion, in the present disclosure, the terminal device first sends at least one initial two-dimensional image to the server, so that the server generates the initial three-dimensional video according to the received initial two-dimensional image; and then the terminal device acquires the initial three-dimensional video from the server, and processes the initial three-dimensional video, so as to obtain the target three-dimensional video. According to the present disclosure, the two-dimensional image on the terminal device is uploaded to the server and is converted into the three-dimensional video by the server, and then the three-dimensional video is processed by the terminal device, so that a three-dimensional video satisfying personalized requirements can be quickly generated from a local two-dimensional image without modifying a hardware apparatus of the terminal device, thereby improving the operation experience and visual experience of the user.

Figure 18:
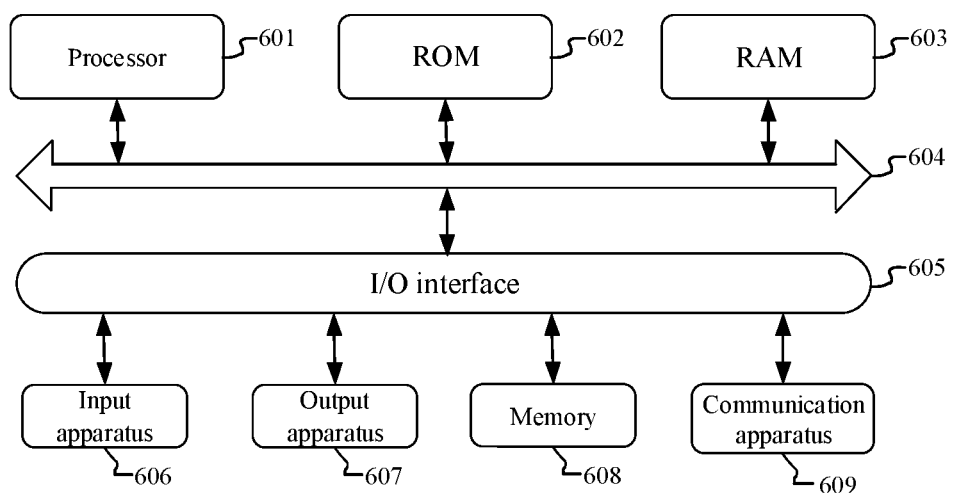
FIG. 18 is a schematic structural diagram illustrating an electronic device according to an illustrative embodiment.

Referring now to FIG. 18, which illustrates a schematic structural diagram of an electronic device 600 (e.g., the terminal device or the server in FIG. 1) applicable to implement embodiments of the present disclosure. The terminal device in the embodiments of the present disclosure may include, but is not limited to, a mobile terminal such as a mobile phone, a laptop computer, a digital broadcast receiver, a PDA (Personal Digital Assistant), a PAD (tablet computer), a PMP (Portable Multimedia Player), an in-vehicle terminal (e.g., an in-vehicle navigating terminal), and the like, and a fixed terminal such as a digital TV, a desktop computer, and the like. The electronic device shown in FIG. 18 is merely an example and should not bring any limitation to the functions and scope of the embodiments of the present disclosure.

As shown in FIG. 18, in a case where the electronic device 600 is implemented as a terminal device, the electronic device 600 may include a processor 601 (for example, a central processing unit, a graphic processor, etc.), which may run programs stored in a memory (e.g., programs stored in a read-only memory (ROM) 602 or programs loaded into a random access memory (RAM) 603 from a memory 608) to perform the following operations: sending at least one initial two-dimensional image to a server, which causes the server to generate an initial three-dimensional video according to the at least one initial two-dimensional image; receiving the initial three-dimensional video sent by the server; and processing the initial three-dimensional video to obtain a target three-dimensional video. The processor 601 may run the programs to implement the functions implemented by the above embodiments of the present disclosure and/or other desired functions.

In addition, in a case where the electronic device 600 is implemented as a server, the processor 601 in the electronic device 600 may further run programs stored in the memory (for example, programs stored in the read-only memory 602 or programs loaded into the random access memory 603 from the memory 608) to perform the following operations: receiving at least one initial two-dimensional image sent by a terminal device, generating an initial three-dimensional video according to the at least one initial two-dimensional image; and sending the initial three-dimensional video to the terminal device, which causes the terminal device to process the initial three-dimensional video to obtain a target three-dimensional video. The processor 601 may run the programs to implement the functions implemented by the above embodiments of the present disclosure and/or other desired functions.

In the RAM 603, various programs and data necessary for operations of the electronic device 600 are also stored. The processor 601, the ROM 602, and the RAM 603 are connected to each other via a bus 604. An input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope, and the like; an output apparatus 607 including, for example, a liquid crystal display (LCD), a speaker, a vibrator, and the like; a memory 608 including, for example, a magnetic tape, a hard disk, and the like; and a communication apparatus 609. The communication apparatus 609 can allow the electronic device 600 to perform wireless or wired communication with other devices to exchange data. While FIG. 18 illustrates the electronic device 600 having a variety of apparatuses, it should be understood that, not all of the illustrated apparatuses need to be implemented or provided, and more or less apparatuses may alternatively be implemented or provided.

In particular, according to embodiments of the present disclosure, the above processes with reference to the flowcharts can be implemented as computer software programs. For example, an embodiment of the present application provides a computer program product, including a computer program hosted on a computer readable medium. The computer program includes program codes for executing the methods as shown in the flowcharts. In some such embodiments, the computer program may be downloaded and installed from the network via the communication apparatus 609, the memory 608, or the ROM 602. When the computer program is executed by the processor 601, the following operations are executed: sending at least one initial two-dimensional image to a server, which causes the server to generate an initial three-dimensional video according to the at least one initial two-dimensional image; receiving the initial three-dimensional video sent by the server; and processing the initial three-dimensional video to obtain a target three-dimensional video.

In addition, an embodiment of the present application further provides a computer program product, including a computer program hosted on a computer readable medium. The computer program includes program codes for executing the methods as shown in the flowcharts. In some such embodiments, the computer program may be downloaded and installed from the network via the communication apparatus 609, the memory 608, or the ROM 602. When the computer program is executed by the processor 601, the following operations are executed: receiving at least one initial two-dimensional image sent by a terminal device, generating an initial three-dimensional video according to the at least one initial two-dimensional image; and sending the initial three-dimensional video to the terminal device, which causes the terminal device to process the initial three-dimensional video to obtain a target three-dimensional video.

An embodiment of the present application further includes a computer program, when being run on an electronic device, the following operations are executed: sending at least one initial two-dimensional image to a server, which causes the server to generate an initial three-dimensional video according to the at least one initial two-dimensional image; receiving the initial three-dimensional video sent by the server; and processing the initial three-dimensional video to obtain a target three-dimensional video.

In addition, an embodiments of the present application further includes a computer program, when being run on an electronic device, the following operations are executed: receiving at least one initial two-dimensional image sent by a terminal device, generating an initial three-dimensional video according to the at least one initial two-dimensional image; and sending the initial three-dimensional video to the terminal device, which causes the terminal device to process the initial three-dimensional video to obtain a target three-dimensional video.

An embodiment of the present application further provides a computer readable storage medium, which stores a program for executing the methods described in the above embodiments. When the computer program is executed by the processor, the processor may implement the functions of the above embodiments of the present disclosure and/or other desired functions.

It should be noted that the described computer readable medium of the present disclosure may include a computer readable signal medium or a computer readable storage medium or any combination of the described two. The computer readable storage medium may include, for example, but is not limited to, an electronic, magnetic, optical, electromagnetic, infrared, or semiconductor system, apparatus, or device, or any combination of the foregoing. More specific examples of the computer readable storage medium may include, but are not limited to, an electrical connection having one or more wires, a portable computer diskette, a hard disk, a random access memory (RAM), a read only memory (ROM), an erasable programmable read only memory (EPROM or Flash memory), an optical fiber, a portable compact disc read only memory (CD-ROM), an optical storage device, a magnetic storage device, or any suitable combination of the foregoing. In the present disclosure, the computer readable storage medium may be any tangible medium that can contain or store a program for use by or in combination with an instruction execution system, apparatus, or device. In the present disclosure, the computer readable signal medium may include data signals propagated in a baseband or as part of a carrier wave, with computer readable program codes hosted thereon. Such propagated data signals may adopt a variety of forms, including, but not limited to, electro-magnetic signals, optical signals, or any suitable combination thereof. The computer readable signal medium may also include any computer readable medium except the computer readable storage medium, and the computer readable signal medium can send, propagate, or transmit a program for use by or in combination with an instruction execution system, apparatus, or device. Program codes included on the computer readable medium may be transmitted using any appropriate medium, including, but not limited to, a wireline, an optical fiber cable, an RF (radio frequency), etc., or any suitable combination of the foregoing.

In some embodiments, the terminal device and the server can communicate using any network protocol which is currently known or developed in the future such as an HTTP (Hypertext Transfer Protocol) and can be interconnected with digital data communication (e.g., a communication network) in any form or medium. Examples of the communication network include a local area network (LAN), a wide area network (WAN), an internetwork (e.g., the Internet), and a peer-to-peer network (e.g., an ad hoc peer-to-peer network), as well as any network which is currently known or developed in the future.

The computer readable storage medium may be included in the electronic device, or may be separate from the electronic device and not incorporated in the electronic device.

The computer readable storage medium hosts one or more programs, which, when being executed by the electronic device, causes the electronic device to execute the following operations: sending at least one initial two-dimensional image to a server, which causes the server to generate an initial three-dimensional video according to the at least one initial two-dimensional image; receiving the initial three-dimensional video sent by the server; and processing the initial three-dimensional video to obtain a target three-dimensional video.

Or, the computer-readable storage medium hosts one or more programs, which, when being executed by the electronic device, causes the electronic device to execute the following operations: receiving at least one initial two-dimensional image sent by a terminal device, generating an initial three-dimensional video according to the at least one initial two-dimensional image; and sending the initial three-dimensional video to the terminal device, which causes the terminal device to process the initial three-dimensional video to obtain a target three-dimensional video.

In addition, the computer readable storage medium hosts one or more programs, which, when being executed by the electronic device, causes the electronic device to implement the functions of the above embodiments of the present disclosure and/or other desired functions.

The computer program codes for carrying out operations of the present disclosure may be written in one or more programming languages, or a combination thereof. The above programming languages include, but are not limited to, an object oriented programming language such as Java, Smalltalk, C++, and conventional procedural programming languages, such as C language or similar programming languages. The program codes may execute entirely on a user's computer, partly on the user's computer, as a stand-alone software package, partly on the user's computer and partly on a remote computer or entirely on the remote computer or server. In the scenario regarding the remote compute, the remote computer may be connected to the user's computer through any type of network, including a local area network (LAN) or a wide area network (WAN), or may be connected to an external computer (for example, connect through the Internet by an Internet service provider).

The flowcharts and block diagrams in the accompanying drawings illustrate the architectures, functions, and operations of possible implementations of systems, methods and computer program products according to various embodiments of the present disclosure. In this regard, each block in the flowcharts or block diagrams may represent a module, a program segment, or a portion of the codes, which includes one or more executable instructions for implementing specified logical functions. It should also be noted that, in some alternative implementations, the functions noted in the blocks may occur out of the order noted in the accompanying drawings. For example, two blocks shown in succession may, in fact, be executed substantially concurrently, or the blocks may sometimes be executed in a reverse order, depending upon the involved functions. It should also be noted that each block of the block diagrams and/or flowcharts, and combinations of blocks in the block diagrams and/or flowcharts, can be implemented by special purpose hardware-based systems which perform specified functions or operations, or implemented by combinations of special purpose hardware and computer instructions.

The modules involved in the embodiments of the present disclosure may be implemented by software or by hardware. The name of a module does not constitute a limitation to the module itself in a certain case. For example, a sending module may also be described as "a module which sends at least one initial two-dimensional image".

The above described functions herein may be performed, at least in part, by one or more hardware logic components. For example, without limitation, exemplary types of hardware logic components which can be used include a field programmable gate array (FPGA), an application specific integrated circuit (ASIC), an application specific standard product (ASSP), a system on chip (SOC), a complex programmable logic device (CPLD), etc.

According to one or more embodiments of the present disclosure, example 1 provides a method for processing a three-dimensional video, which is applied to a terminal device, and includes: sending at least one initial two-dimensional image to a server, which enables the server to generate an initial three-dimensional video according to the at least one initial two-dimensional image; receiving the initial three-dimensional video sent by the server; and processing the initial three-dimensional video to obtain a target three-dimensional video.

According to one or more embodiments of the present disclosure, example 2 provides the method of example 1, where the processing the initial three-dimensional video to obtain the target three-dimensional video includes: decoding the initial three-dimensional video according to decoding parameters to obtain an initial image frame set of the initial three-dimensional video; and processing the initial image frame set according to configuration parameters to obtain the target three-dimensional video.

According to one or more embodiments of the present disclosure, example 3 provides the method of example 2, the configuration parameters include at least one of the following parameters: rendering parameters and splicing parameters, furthermore, the processing the initial image frame set according to the configuration parameters to obtain the target three-dimensional video includes: according to the rendering parameters, rendering at least one initial image frame in the initial image frame set to obtain the rendered image frame set, and splicing image frames in the rendered image frame set according to the splicing parameters to obtain the target three-dimensional video; or rendering at least one initial image frame in the initial image frame set according to the rendering parameters to obtain the target three-dimensional video; or, splicing initial image frames in the initial image frame set according to the splicing parameters to obtain the target three-dimensional video.

According to one or more embodiments of the present disclosure, example 4 provides the method of example 3, where the processing the initial three-dimensional video to obtain the target three-dimensional video further includes: determining a rendering space and/or a time axis; the processing the initial image frame set according to the configuration parameters to obtain the target three-dimensional video includes: according to the rendering parameters, rendering the at least one initial image frame in the initial image frame set in the rendering space to obtain the rendered image frame set, and according to an indication of the time axis, splicing the image frames in the rendered image frame set according to the splicing parameters to obtain the target three-dimensional video; or rendering the at least one initial image frame in the initial image frame set in the rendering space according to the rendering parameters to obtain the target three-dimensional video; or, according to a time sequence indicated by the time axis, splicing the initial image frames in the initial image frame set according to the splicing parameters to obtain the target three-dimensional video.

According to one or more embodiments of the present disclosure, example 5 provides the method of example 1, before the sending the at least one initial two-dimensional image to the server, the method further includes: acquiring a target model according to the received model selecting instruction, where the model selecting instruction includes target model information for indicating the target model; determining image parameters included in the target model; and determining the at least one initial two-dimensional image which matches the image parameters.

According to one or more embodiments of the present disclosure, example 6 provides the method of example 5, and the acquiring the target model according to the received model selecting instruction includes: in response to the model selecting instruction, searching the terminal device for the target model corresponding to the target model information; when the target model does not exist on the terminal device, sending a request to the server, which enables the server to determine and send the target model; and receiving the target model sent by the server.

According to one or more embodiments of the present disclosure, example 7 provides the method of example 2, where after the decoding the initial three-dimensional video according to the decoding parameters to obtain the initial image frame set of the initial three-dimensional video, the processing the initial three-dimensional video to obtain the target three-dimensional video further includes: determining a display order of each initial image frame in the initial image frame set according to a preset rule; and the processing the initial image frame set according to the configuration parameters to obtain the target three-dimensional video includes: according to the configuration parameters, processing the initial image frames in the initial image frame set according to the display order to obtain the target three-dimensional video.

According to one or more embodiments of the present disclosure, example 8 provides the method of example 2, after processing the initial image frames in the initial image frame set according to the configuration parameters to obtain the processed image frame set, the processing the initial three-dimensional video to obtain the target three-dimensional video further includes: determining a display order of each image frame in the processed image frame set according to a preset rule, and adjusting positions of the image frames in the processed image frame set according to the display order to obtain the target three-dimensional video.

According to one or more embodiments of the present disclosure, example 9 provides a method for processing a three-dimensional video, which is applied to a server and includes: receiving at least one initial two-dimensional image sent by a terminal device, and generating an initial three-dimensional video according to the at least one initial two-dimensional image; and sending the initial three-dimensional video to the terminal device, which enables the terminal device to perform processing on the initial three-dimensional video to obtain a target three-dimensional video.

According to one or more embodiments of the present disclosure, example 10 provides the method of example 9, before the receiving the initial two-dimensional image sent by the terminal device, the method further includes: receiving a request sent by the terminal device, where the request is a request sent by the terminal device when no target model exists on the terminal device; acquiring a target model in response to the request, where the target model includes image parameters; and sending the target model to the terminal device, which enables the terminal device to determine the at least one initial two-dimensional image which matches the image parameters.

According to one or more embodiments of the present disclosure, example 11 provides an apparatus for processing a three-dimensional video, including: a sending module, configured to send at least one initial two-dimensional image to a server, which enables the server to generate an initial three-dimensional video according to the at least one initial two-dimensional image; a receiving module, configured to receive the initial three-dimensional video sent by the server; and a processing module, configured to process the initial three-dimensional video to obtain a target three-dimensional video.

According to one or more embodiments of the present disclosure, example 12 provides an apparatus for processing a three-dimensional video, including: a receiving module, configured to receive at least one initial two-dimensional image sent by a terminal device, and generate an initial three-dimensional video according to the at least one initial two-dimensional image; and a sending module, configured to send the initial three-dimensional video to the terminal device, which enables the terminal device to process the initial three-dimensional video to obtain a target three-dimensional video.

According to one or more embodiments of the present disclosure, example 13 provides a computer readable storage medium, on which a computer program is stored, where when the program is executed by a processor, the method according to example 1 to example 8 is implemented.

According to one or more embodiments of the present disclosure, example 14 provides a computer readable storage medium, on which a computer program is stored, when the program is executed by a processor, the method according to example 9 or example 10 is implemented.

According to one or more embodiments of the present disclosure, example 15 provides an electronic device, including: a memory, on which a computer program is stored; a processor, configured to execute the computer program stored in the memory, so as to implement the method according to example 1 to example 8.

According to one or more embodiments of the present disclosure, example 16 provides an electronic device, including: a memory, on which a computer program is stored; a processor, configured to execute the computer program stored in the memory, so as to implement the method according to example 9 or example 10.

According to one or more embodiments of the present disclosure, example 17 provides a system, including: a terminal device and a server; the terminal device is configured to implement the method according to example 1 to example 8; and the server is configured to implement the method according to example 9 or example 10.

The foregoing description is merely illustrative for the preferred embodiments of the present disclosure and the technical principles applied thereto. It should be understood by a person skilled in the art, the scope of the present disclosure is not limited to technical solutions formed by a specific combination of the described technical features, and should also cover other technical solutions formed by any combination of the described technical features or equivalent features thereof without departing from the described disclosed concept, for example, technical solutions formed by replacing the above features with technical features which have similar functions and are disclosed in the present disclosure (but not limited thereto).

In addition, while the operations are depicted in a particular order, this should not be understood as requiring that the operations be performed in the illustrated particular order or in sequential order. Multitasking and parallel processing may be advantageous in certain circumstances. Likewise, while several specific implementation details are included in the above discussion, these should not be construed as limiting the scope of the present disclosure. Certain features which are described in the context of separate embodiments can also be implemented in combination in a single embodiment. Conversely, various features which are described in the context of a single embodiment can also be implemented in multiple embodiments separately or in any suitable sub-combination.

Although the subject matter has been described in language specific to structural features and/or methodological operations, it should be understood that the subject matter defined in the appended claims is not necessarily limited to the specific features or operations which are described above. Instead, the described specific features and operations are merely illustrative forms for implementing the claims. With respect to the apparatus in the foregoing embodiments, the specific manner in which the modules execute the operations has been described in detail in the method embodiments, which is not described in detail herein.

What is claimed is:

1. A method for processing a three-dimensional video, applied to a terminal device, wherein the method comprises:
    sending at least one initial two-dimensional image to a server, which enables the server to generate an initial three-dimensional video according to the at least one initial two-dimensional image;
    receiving the initial three-dimensional video sent by the server; and
    performing processing on the initial three-dimensional video to obtain a target three-dimensional video;
    wherein before the sending the at least one initial two-dimensional image to the server, the method further comprises:
    in response to a received model selecting instruction, searching the terminal device for a target model corresponding to target model information, wherein the received model selecting instruction comprises the target model information for indicating the target model;

when the target model does not exist on the terminal device, sending a request to the server, which enables the server to determine and send the target model; and receiving the target model sent by the server.

2. The method according to claim 1, wherein the performing processing on the initial three-dimensional video to obtain the target three-dimensional video comprises:
  decoding the initial three-dimensional video according to decoding parameters to obtain an initial image frame set of the initial three-dimensional video; and
  performing processing on the initial image frame set according to configuration parameters to obtain the target three-dimensional video.

3. The method according to claim 2, wherein the configuration parameters comprise at least one of the following parameters: rendering parameters and splicing parameters, and the performing processing on the initial image frame set according to the configuration parameters to obtain the target three-dimensional video comprises:
  performing rendering on at least one initial image frame in the initial image frame set according to the rendering parameters to obtain the rendered image frame set, and performing splicing on image frames in the rendered image frame set according to the splicing parameters to obtain the target three-dimensional video; or,
  performing rendering on at least one initial image frame in the initial image frame set according to the rendering parameters to obtain the target three-dimensional video; or,
  performing splicing on initial image frames in the initial image frame set according to the splicing parameters to obtain the target three-dimensional video.

4. The method according to claim 3, wherein the performing processing on the initial three-dimensional video to obtain the target three-dimensional video further comprises:
  determining at least one of a rendering space and a time axis;
  the performing processing on the initial image frame set according to the configuration parameters to obtain the target three-dimensional video comprises:
  according to the rendering parameters, performing rendering on the at least one initial image frame in the initial image frame set in the rendering space to obtain the rendered image frame set, and according to a time sequence indicated by the time axis, performing splicing on the image frames in the rendered image frame set according to the splicing parameters to obtain the target three-dimensional video; or,
  performing rendering on the at least one initial image frame in the initial image frame set in the rendering space according to the rendering parameters to obtain the target three-dimensional video; or,
  according to an indication of the time axis, performing splicing on the initial image frames in the initial image frame set according to the splicing parameters to obtain the target three-dimensional video.

5. The method according to claim 1, wherein before the sending the at least one initial two-dimensional image to the server, the method further comprises:
  determining image parameters comprised in the target model; and
  determining the at least one initial two-dimensional image which matches the image parameters.

6. The method according to claim 2, wherein after the decoding the initial three-dimensional video according to the decoding parameters to obtain the initial image frame set of the initial three-dimensional video, the performing processing on the initial three-dimensional video to obtain the target three-dimensional video further comprises:
  determining a display order of each initial image frame in the initial image frame set according to a preset rule; and
  the performing processing on the initial image frame set according to the configuration parameters to obtain the target three-dimensional video comprises:
  according to the configuration parameters, performing processing on the initial image frames in the initial image frame set according to the display order to obtain the target three-dimensional video.

7. A method for processing a three-dimensional video, applied to a server, wherein the method comprises:
  receiving at least one initial two-dimensional image sent by a terminal device, and generating an initial three-dimensional video according to the at least one initial two-dimensional image; and
  sending the initial three-dimensional video to the terminal device, which enables the terminal device to perform processing on the initial three-dimensional video to obtain a target three-dimensional video;
  wherein before the receiving the initial two-dimensional image sent by the terminal device, the method further comprises:
  receiving a request sent by the terminal device, wherein the request is a request sent by the terminal device when no target model exists on the terminal device;
  in response to the request, acquiring a target model comprising image parameters; and
  sending the target model to the terminal device, which enables the terminal device to determine the at least one initial two-dimensional image which matches the image parameters.

8. A non-transitory computer readable storage medium, on which a computer program is stored, wherein the program is configured to implement the method according to claim 1 when being executed by a processor.

9. A non-transitory computer readable storage medium, on which a computer program is stored, wherein the program is configured to implement the method according to claim 7 when being executed by a processor.

10. An electronic device, comprising:
  a memory, on which a computer program is stored; and
  a processor, configured to execute the computer program stored in the memory, so as to:
  send at least one initial two-dimensional image to a server, which enables the server to generate an initial three-dimensional video according to the at least one initial two-dimensional image;
  receive the initial three-dimensional video sent by the server; and
  perform processing on the initial three-dimensional video to obtain a target three-dimensional video;
  wherein the processor is further execute the computer program stored in the memory, so as to:
  in response to a received model selecting instruction, search the electronic device for a target model corresponding to target model information, wherein the received model selecting instruction comprises the target model information for indicating the target model;
  when the target model does not exist on the terminal device, send a request to the server, which enables the server to determine and send the target model; and
  receive the target model sent by the server.

11. The electronic device according to claim 10, wherein the processor is further execute the computer program stored in the memory, so as to:
- decode the initial three-dimensional video according to decoding parameters to obtain an initial image frame set of the initial three-dimensional video; and
- perform processing on the initial image frame set according to configuration parameters to obtain the target three-dimensional video.

12. The electronic device according to claim 11, wherein the configuration parameters comprise at least one of the following parameters: rendering parameters and splicing parameters, and the processor is further execute the computer program stored in the memory, so as to:
- perform rendering on at least one initial image frame in the initial image frame set according to the rendering parameters to obtain the rendered image frame set, and perform splicing on image frames in the rendered image frame set according to the splicing parameters to obtain the target three-dimensional video; or,
- perform rendering on at least one initial image frame in the initial image frame set according to the rendering parameters to obtain the target three-dimensional video; or,
- perform splicing on initial image frames in the initial image frame set according to the splicing parameters to obtain the target three-dimensional video.

13. The electronic device according to claim 12, wherein the processor is further execute the computer program stored in the memory, so as to:
- determine at least one of a rendering space and a time axis;
- according to the rendering parameters, perform rendering on the at least one initial image frame in the initial image frame set in the rendering space to obtain the rendered image frame set, and according to a time sequence indicated by the time axis, perform splicing on the image frames in the rendered image frame set according to the splicing parameters to obtain the target three-dimensional video; or,
- perform rendering on the at least one initial image frame in the initial image frame set in the rendering space according to the rendering parameters to obtain the target three-dimensional video; or,
- according to an indication of the time axis, perform splicing on the initial image frames in the initial image frame set according to the splicing parameters to obtain the target three-dimensional video.

14. The electronic device according to claim 10, wherein the processor is further execute the computer program stored in the memory, so as to:
- determine image parameters comprised in the target model; and
- determine the at least one initial two-dimensional image which matches the image parameters.

15. The electronic device according to claim 11, wherein the processor is further execute the computer program stored in the memory, so as to:
- determine a display order of each initial image frame in the initial image frame set according to a preset rule; and
- according to the configuration parameters, perform processing on the initial image frames in the initial image frame set according to the display order to obtain the target three-dimensional video.

16. An electronic device, comprising:
- a memory, on which a computer program is stored; and
- a processor, configured to execute the computer program stored in the memory, so as to implement the method according to claim 7.

17. A system for processing a three-dimensional video, wherein the system comprises a terminal device and a server;
the terminal device is configured to:
- send at least one initial two-dimensional image to the server, which enables the server to generate an initial three-dimensional video according to the at least one initial two-dimensional image;
- receive the initial three-dimensional video sent by the server; and
- perform processing on the initial three-dimensional video to obtain a target three-dimensional video; and
the server is configured to implement the method according to claim 7.

* * * * *